US011785357B2

(12) United States Patent
Ha

(10) Patent No.: US 11,785,357 B2
(45) Date of Patent: Oct. 10, 2023

(54) IMAGE SENSING DEVICE OPERATABLE IN A PLURALITY OF MODES

(71) Applicant: SK hynix Inc., Icheon-si (KR)

(72) Inventor: Dong Ho Ha, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 0 days.

(21) Appl. No.: 17/688,617

(22) Filed: Mar. 7, 2022

(65) Prior Publication Data
US 2022/0329745 A1 Oct. 13, 2022

(30) Foreign Application Priority Data

Apr. 9, 2021 (KR) .................. 10-2021-0046554

(51) Int. Cl.
*H04N 25/585* (2023.01)
*H04N 25/46* (2023.01)
*H04N 25/709* (2023.01)
*H04N 25/71* (2023.01)
*H04N 25/772* (2023.01)
*H04N 25/778* (2023.01)

(52) U.S. Cl.
CPC ......... *H04N 25/585* (2023.01); *H04N 25/46* (2023.01); *H04N 25/709* (2023.01); *H04N 25/745* (2023.01); *H04N 25/772* (2023.01); *H04N 25/778* (2023.01)

(58) Field of Classification Search
CPC .. H04N 5/35563; H04N 5/347; H04N 5/3698; H04N 5/37455; H04N 5/37457; H04N 5/3765; H04N 25/585; H04N 25/46; H04N 25/709; H04N 25/745; H04N 25/772; H04N 25/778; H04N 25/59; H04N 25/75; H04N 25/771; H04N 25/42
USPC ........................................................ 348/301
See application file for complete search history.

(56) References Cited

U.S. PATENT DOCUMENTS

| 7,782,368 | B2 | 8/2010 | Okada | |
| 2009/0225207 | A1* | 9/2009 | Jung | H04N 23/73 348/E5.091 |
| 2012/0169909 | A1* | 7/2012 | Rysinski | H04N 5/374 348/E5.091 |
| 2013/0147979 | A1 | 6/2013 | Mcmahon et al. | |
| 2014/0160334 | A1* | 6/2014 | Wakabayashi | H04N 25/42 348/308 |
| 2016/0255293 | A1* | 9/2016 | Gesset | H04N 25/57 348/308 |

(Continued)

*Primary Examiner* — Usman A Khan
(74) *Attorney, Agent, or Firm* — Perkins Coie LLP

(57) ABSTRACT

An image sensing device is provided to comprise: a pixel array of pixels that are operable to sense light to produce pixel signals and are operable to operate in one of a plurality of modes in sensing of light, wherein a first pixel of the pixel array is controlled to operate in a mode selected from the plurality of modes and configured to output a pixel signal in response to light incident onto the first pixel; and an analog-to-digital converter (ADC) coupled to the pixel array to receive the pixel signal from the first pixel and configured to set, based on the mode selected for the first pixel in generating the pixel signal, an input range indicating a voltage range of the pixel signal and perform an analog to digital conversion of the pixel signal generated by the first pixel to produce pixel data representing the pixel signal based on the input range of the analog-to-digital converter (ADC).

20 Claims, 15 Drawing Sheets

(56) References Cited

U.S. PATENT DOCUMENTS

2016/0309109 A1\* 10/2016 Song .................... H04N 5/3745
2018/0170545 A1\*  6/2018 Harms ...................... B64C 1/22
2019/0371828 A1   12/2019 Ebihara \* cited by examiner 800a

| S11 | S12 | S13 | S14 | S15 | S16 | S17 | S18 |
|-----|-----|-----|-----|-----|-----|-----|-----|
| S21 | S22 | S23 | S24 | S25 | S26 | S27 | S28 |
| S31 | S32 | S33 | S34 | S35 | S36 | S37 | S38 |
| S41 | S42 | S43 | S44 | S45 | S46 | S47 | S48 |

| B11 | B12 | B13 | B14 | B15 | B16 | B17 | B18 |
|-----|-----|-----|-----|-----|-----|-----|-----|
| B21 | B22 | B23 | B24 | B25 | B26 | B27 | B28 |

FIG.8B

| 0 | 0 | 0 | 0 | 0 | 200 | 0 | 0 |
|---|---|---|---|---|---|---|---|
| 0 | 0 | 100 | 0 | 0 | 0 | 0 | 0 |
| 0 | 120 | 0 | 0 | 40 | 0 | 1000 | 0 |
| 0 | 0 | 0 | 0 | 40 | 0 | 0 | 0 |

Defect Ratio : 1/8

FIG.10A

Defect Ratio : 5/16

FIG.10B

| 0 | 0 | 75 | 0 | 0 | 150 | 0 | 0 |
|---|---|----|---|---|-----|---|---|
| 0 | 90 | 0 | 0 | 60 | 0 | 1000 | 0 |

Defect Ratio : 3/16

IMAGE SENSING DEVICE OPERATABLE IN A PLURALITY OF MODES

CROSS-REFERENCE TO RELATED APPLICATION

This patent document claims the priority and benefits of Korean patent application No. 10-2021-0046554, filed on Apr. 9, 2021, the disclosure of which is incorporated herein by reference in its entirety as part of the disclosure of this patent document.

TECHNICAL FIELD

The technology and implementations disclosed in this patent document generally relate to an image sensing device including pixels capable of operating in various modes.

BACKGROUND

An image sensing device is a device for capturing optical images by converting light into electrical signals using a photosensitive semiconductor material which reacts to light. With the development of automotive, medical, computer and communication industries, the demand for high-performance image sensing devices is increasing in various fields such as smart phones, digital cameras, game machines, IoT (Internet of Things), robots, security cameras and medical micro cameras.

The image sensing device may be roughly divided into CCD (Charge Coupled Device) image sensing devices and CMOS (Complementary Metal Oxide Semiconductor) image sensing devices. The CCD image sensing devices offer a better image quality, but they tend to consume more power and are larger as compared to the CMOS image sensing devices. The CMOS image sensing devices are smaller in size and consume less power than the CCD image sensing devices. Furthermore, CMOS sensors are fabricated using the CMOS fabrication technology, and thus photosensitive elements and other signal processing circuitry can be integrated into a single chip, enabling the production of miniaturized image sensing devices at a lower cost. For these reasons, CMOS image sensing devices are being developed for many applications including mobile devices.

SUMMARY

Various embodiments of the disclosed technology relate to an image sensing device including an analog-to-digital converter (ADC) configured to perform operations suitable for modes of pixels.

In accordance with an embodiment of the disclosed technology, an image sensing device may include a pixel array configured to include a first pixel operating in a mode selected from among a plurality of modes, and an analog-to-digital converter (ADC) configured to convert a pixel signal generated by the first pixel into pixel data according to an input range corresponding to the selected mode. The input range may refer to a voltage range in which the pixel signal is capable of being converted into pixel data corresponding to the pixel signal.

In another aspect, an image sensing device is provided to comprise: a pixel array of pixels that are operable to sense light to produce pixel signals and are operable to operate in one of a plurality of modes in sensing of light, wherein a first pixel of the pixel array is controlled to operate in a mode selected from the plurality of modes and configured to output a pixel signal in response to light incident onto the first pixel; and an analog-to-digital converter (ADC) coupled to the pixel array to receive the pixel signal from the first pixel and configured to set, based on the mode selected for the first pixel in generating the pixel signal, an input range indicating a voltage range of the pixel signal and perform an analog to digital conversion of the pixel signal generated by the first pixel to produce pixel data representing the pixel signal based on the input range of the analog-to-digital converter (ADC).

In accordance with another embodiment of the disclosed technology, an image sensing device may include an analog-to-digital converter (ADC) configured to receive a pixel signal generated by a first pixel operating in a mode selected from among a plurality of modes, and convert the pixel signal into pixel data according to an input range corresponding to the selected mode, and a timing controller configured to control the first pixel to operate in the selected mode, and control the input range of the analog-to-digital converter (ADC) to correspond to the selected mode. The input range may refer to a voltage range in which the pixel signal is capable of being converted into pixel data corresponding to the pixel signal.

In another aspect, an image sensing device is provided to comprise a pixel operable to sense light in one of different modes with different sensing characteristics and configured to output a pixel signal in response to incident light when being controlled to operate in a mode selected from the different modes; an analog-to-digital converter (ADC) configured to receive the pixel signal from the pixel operating in the selected mode and convert the pixel signal into pixel data based on an input range of the analog-to-digital converter (ADC) that is set based on the selected mode from the different modes in operating the pixel in sensing the incident light; and a timing controller coupled to be in communication with the analog-to-digital converter (ADC) and configured to control the analog-to-digital converter (ADC) to set the input range of the analog-to-digital converter (ADC) based on the selected mode of the pixel, wherein the input range is a voltage range in which the analog-to-digital converter (ADC) is operable to perform analog-to-digital conversion of the pixel signal when the pixel signal is within the input range.

It is to be understood that both the foregoing general description and the following detailed description of the disclosed technology are illustrative and explanatory and are intended to provide further explanation of the disclosure as claimed.

BRIEF DESCRIPTION OF THE DRAWINGS

The above and other features and beneficial aspects of the disclosed technology will become readily apparent with reference to the following detailed description when considered in conjunction with the accompanying drawings.

FIG. 8A is a diagram illustrating an example of an operation scheme of the pixel array shown in FIG. 1 based on some implementations of the disclosed technology.

FIG. 8B is a diagram illustrating another example of an operation scheme of the pixel array shown in FIG. 1 based on some implementations of the disclosed technology.

FIG. 10A is a diagram illustrating an example of pixel data of a plurality of single pixels shown in FIG. 8A.

FIG. 10B is a diagram illustrating an example of pixel data of a plurality of binning pixels shown in FIG. 8B according to comparative examples of the disclosed technology.

FIG. 10C is a diagram illustrating an example of pixel data of binning pixels shown in FIG. 8B based on some implementations of the disclosed technology.

DETAILED DESCRIPTION

The disclosed technology provides implementations and examples of image sensing device designs including pixels capable of operating in various modes. Some implementations of the disclosed technology relate to the image sensing device including an analog-to-digital converter (ADC) configured to perform operations corresponding to modes of pixels. The disclosed technology provides various implementations of an image sensing device which can vary an input range of an Analog-to-Digital Converter (ADC) based on each mode of pixels, thereby acquiring pixel data optimized for each mode of pixels. The disclosed technology may be implemented in various ways to provide one or more effects, characteristics, advantages or benefits.

Figure 1:
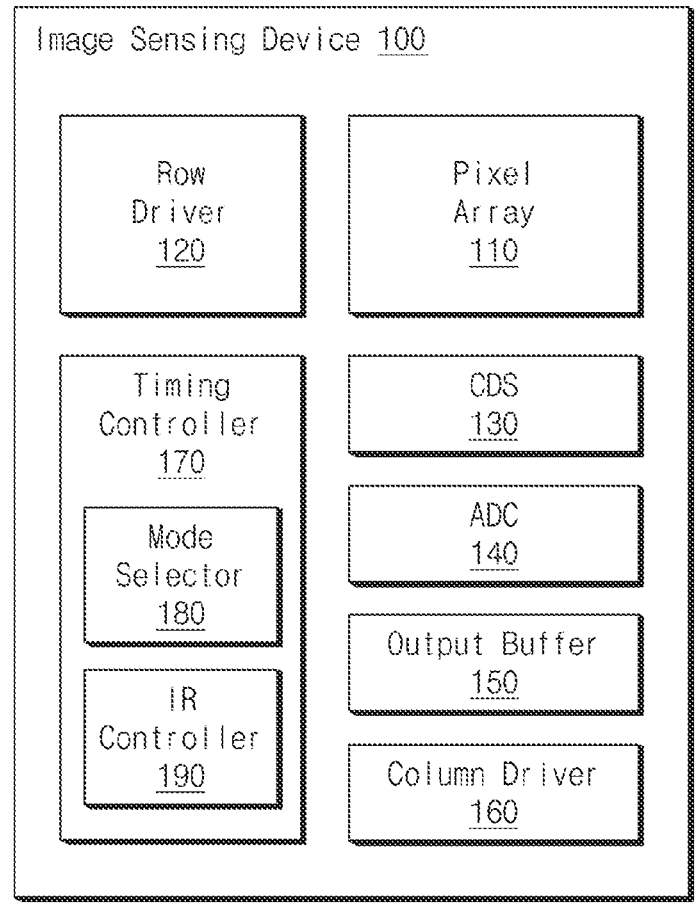
FIG. 1 is a block diagram illustrating an example of an image sensing device based on some implementations of the disclosed technology.

FIG. 1 is a block diagram illustrating an image sensing device 100 according to an embodiment of the disclosed technology.

Referring to FIG. 1, the image sensing device 100 may include a pixel array 110, a row driver 120, a correlated double sampler (CDS) 130, an analog-digital converter (ADC) 140, an output buffer 150, a column driver 160, and a timing controller 170. The components of the image sensing device 100 illustrated in FIG. 1 are discussed by way of example only, and this patent document encompasses numerous other changes, substitutions, variations, alterations, and modifications.

The pixel array 110 may include a plurality of unit imaging pixels arranged in rows and columns. In one example, the plurality of unit imaging pixels can be arranged in a two-dimensional pixel array including rows and columns. In another example, the plurality of unit imaging pixels can be arranged in a three-dimensional pixel array. The plurality of unit pixels may convert an optical input scene or received incident light into electrical signals on a unit pixel basis where each unit pixel produces an electrical signal representing received light by that unit pixel or a pixel group basis where different adjacent unit pixels are grouped together to produce an electrical signal for the pixel group representing received light by the different pixels within the pixel group and the different unit pixels in a pixel group share at least certain internal circuitry. The pixel array 110 may receive driving signals, including a row selection signal, a pixel reset signal and a transmission signal, from the row driver 120. Upon receiving the driving signal, corresponding imaging pixels in the pixel array 110 may be activated to perform optical sensing and/or signal processing operations corresponding to the row selection signal, the pixel reset signal, and the transmission signal.

The row driver 120 may activate the pixel array 110 to perform certain operations on the imaging pixels in the corresponding row based on commands and control signals provided by controller circuitry such as the timing controller 170. In some implementations, the row driver 120 may select one or more imaging pixels arranged in one or more rows of the pixel array 110. The row driver 120 may generate a row selection signal to select one or more rows among the plurality of rows. The row decoder 120 may sequentially enable the pixel reset signal for resetting imaging pixels corresponding to at least one selected row, and the transmission signal for the pixels corresponding to the at least one selected row. Thus, a reference signal and an image signal, which are analog signals generated by each of the imaging pixels of the selected row, may be sequentially transferred to the CDS 130. The reference signal may be an electrical signal that is provided to the CDS 130 when a sensing node of an imaging pixel (e.g., floating diffusion node) is reset, and the image signal may be an electrical signal that is provided to the CDS 130 when photocharges generated by the imaging pixel are accumulated in the sensing node.

CMOS image sensors may use the correlated double sampling (CDS) to remove undesired offset values of pixels known as the fixed pattern noise by sampling a pixel signal twice to remove the difference between these two samples. In one example, the correlated double sampling (CDS) may remove the undesired offset value of pixels by comparing pixel output voltages obtained before and after photocharges generated by incident light are accumulated in the sensing node so that only pixel output voltages based on the incident light can be measured. In some embodiments of the disclosed technology, the CDS 130 may sequentially sample and hold voltage levels of the reference signal and the image signal, which are provided to each of a plurality of column lines from the pixel array 110. That is, the CDS 130 may sample and hold the voltage levels of the reference signal and the image signal which correspond to each of the columns of the pixel array 110.

In some implementations, the CDS 130 may transfer the reference signal and the image signal of each of the columns as a correlate double sampling signal to the ADC 140 based on control signals from the timing controller 170.

The ADC 140 is used to convert analog CDS signals into digital signals. In some implementations, the ADC 140 may be implemented as a ramp-compare type ADC. The ramp-compare type ADC may include a comparator circuit for comparing the analog pixel signal with a reference signal such as a ramp signal that ramps up or down, and a timer counts until a voltage of the ramp signal matches the analog pixel signal. In some embodiments of the disclosed technology, the ADC 140 may convert the correlate double sampling signal generated by the CDS 130 for each of the columns into a digital signal, and output the digital signal. The ADC 140 may perform a counting operation and a computing operation based on the correlate double sampling signal for each of the columns and a ramp signal provided from the timing controller 170. In this way, the ADC 140 may eliminate or reduce noises such as reset noise arising from the imaging pixels when generating digital image data.

The ADC 140 may include a plurality of column counters. Each column of the pixel array 110 is coupled to a column counter, and image data can be generated by converting the correlate double sampling signals received from each column into digital signals using the column counter. In another embodiment of the disclosed technology, the ADC 140 may include a global counter to convert the correlate double sampling signals corresponding to the columns into digital signals using a global code provided from the global counter.

The output buffer 150 may temporarily hold the column-based image data provided from the ADC 140 to output the image data. In one example, the image data provided to the output buffer 150 from the ADC 140 may be temporarily stored in the output buffer 150 based on control signals of the timing controller 170. The output buffer 150 may provide an interface to compensate for data rate differences or transmission rate differences between the image sensing device 100 and other devices.

The column driver 160 may select a column of the output buffer upon receiving a control signal from the timing controller 170, and sequentially output the image data, which are temporarily stored in the selected column of the output buffer 150. In some implementations, upon receiving an address signal from the timing controller 170, the column driver 160 may generate a column selection signal based on the address signal and select a column of the output buffer 150, outputting the image data as an output signal from the selected column of the output buffer 150.

The timing controller 170 may be coupled to control operations of the row driver 120, the ADC 140, the output buffer 150 and the column driver 160.

The timing controller 170 may be coupled to or otherwise in communication with the row driver 120, the column driver 160 and the output buffer 150 to provide the row driver 120, the column driver 160 and the output buffer 150 with a clock signal required for the operations of the respective components of the image sensing device 100, a control signal for timing control, and address signals for selecting a row or column. In an embodiment of the disclosed technology, the timing controller 170 may include a logic control circuit, a phase lock loop (PLL) circuit, a timing control circuit, a communication interface circuit and others.

The timing controller 170 may include a mode selector 180 and an input range (IR) controller 190 that are coupled to each other to allow the input range (IR) controller 190 to receive information on the mode selected by the mode selector 180 to enable the input range (IR) controller 190 to control the ADC 140 based on the mode selected. The mode selector 180 may determine a mode of each pixel of the pixel array 110, and may transmit information about the determined mode to the row driver 120 and the IR controller 190.

In some implementations, the mode of each pixel may refer to an operation mode corresponding to each of a plurality of conversion gains (e.g., a high conversion gain HCG, a middle conversion gain MCG, and a low conversion gain LCG) that are implemented to form a high dynamic range (HDR) image for improved imaging sensing under different lighting conditions. The conversion gain may refer to a ratio for converting the number of photocharges generated in each pixel into a voltage of a pixel signal output from the pixel.

In some other implementations, the mode of each pixel may include operation modes (e.g., a single mode and a binning mode) corresponding to the number of unit pixels that can be simultaneously read out from a shared pixel structure. Here, the single mode may refer to an operation mode in which the number of unit pixels that can be simultaneously read out from the shared pixel structure is set to '1', and the binning mode may refer to an operation mode in which the number of unit pixels that can be simultaneously read out from the shared pixel structure is set to 2 or greater.

In some implementations, all pixels included in the pixel array 110 may be controlled to operate in the same identical mode that is selected out of the different available modes. In some other implementations, the pixels included in the pixel array 110 can be operated in different modes in imaging an object. For example, in one operation of the pixel array 110 to image an object, some pixels of the pixel array 110 may operate in a specific mode, and the remaining pixels may operate in one or more different modes from that specific mode.

The IR controller 190 may be coupled to or in communication with the ADC 140 to control the ADC 140 in performing analog-to-digital conversion (ADC) processing of a pixel signal of each pixel within an input range corresponding to the mode of each pixel. In some implementations, the input range of the ADC 140 may refer to a voltage range of a pixel signal that can be effectively converted into digital pixel data included in a predetermined output range (e.g., digital numbers (DNs) of 0~1023). In this case, the effective conversion of the pixel signal may indicate that the digital number (DN) of pixel data of the ADC 140 increases or decreases in response to an increase or decrease in the voltage of the pixel signal. Whereas the pixel signal within the input range of the ADC 140 can be converted into digital pixel data corresponding to the pixel signal, if the pixel signal is not within the input range of the ADC 140, such pixel signal may not be properly converted into pixel data corresponding to the pixel signal. For example, if a pixel signal exceeds the input range of the ADC 140, the pixel signal is converted into saturated pixel data which does not correspond to the pixel signal.

Figure 2:
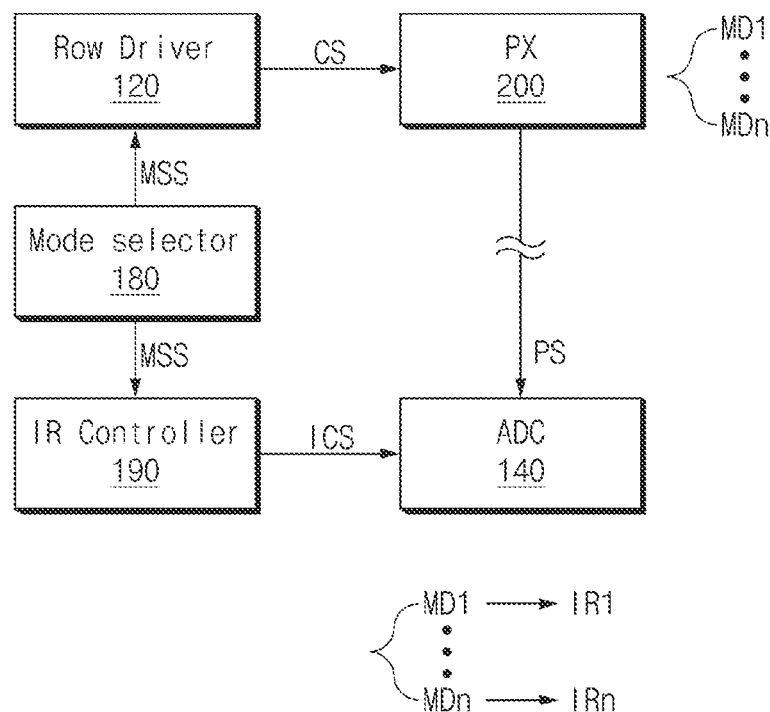
FIG. 2 is a conceptual diagram illustrating an example of a method for varying an input range of an analog-to-digital converter (ADC) by the image sensing device shown in FIG. 1 based on some implementations of the disclosed technology.

FIG. 2 is a conceptual diagram illustrating an example of a method for varying an input range of the analog-to-digital converter (ADC) 140 by the image sensing device 100 shown in FIG. 1 based on some implementations of the disclosed technology.

Referring to FIG. 2, a pixel 200 in the pixel array 110 in FIG. 1 may operate in any one of the plurality of available modes MD1~MDn (where 'n' is an integer of 2 or more). For example, the plurality of modes MD1~MDn may refer to modes having different conversion gains, or may refer to modes having different numbers of pixels that can be simultaneously read out from a shared pixel structure, without being limited thereto. The pixel 200 may be one of the unit pixels included in the pixel array 110 illustrated in FIG. 1.

The mode selector 180 may select a mode of the pixel 200, and may generate a mode selection signal (MSS) corresponding to the selected mode. The mode selector 180 may select a mode of the pixel 200 under control of an external device (e.g., an image processor), and/or may select a mode of the pixel 200 based on a predetermined algorithm. In addition, the mode selector 180 may enable the pixels 200 included in the pixel array 110 to operate in the same mode, or may enable the pixels 200 included to operate in different modes.

The row driver 120 may receive the mode selection signal (MSS) of the mode selector 180, may generate a pixel control signal corresponding to the mode selection signal (MSS), and may thus enable each of the pixels 200 to be driven in a mode corresponding to the mode selection signal (MSS) from among the plurality of modes MD1~MDn.

The IR controller 190 may receive the mode selection signal (MSS) from the mode selector 180, generate an input range control signal (ICS) corresponding to the received mode selection signal (MSS), and thus control the ADC 140 to set the input range of the ADC 140 based on the mode selection information in the received mode selection signal (MSS). The ADC 140 may receive the input range control signal (ICS) and set an input range corresponding to the received input range control signal (ICS). For example, assuming that the first to N-th modes MD1~MDn correspond to a plurality of input ranges IR1~IRn, respectively, the ADC 140 having received the input range control signal (ICS) corresponding to the K-th mode (MDk) (where 'k' is any one of 1~n) may be configured to have the k-th input range (IRk). In this case, the ADC 140 may perform conversion of a pixel signal (PS) output from the pixel 200 that is driven in the k-th mode (MDk) within the k-th input range (IRk), and may thus generate pixel data. Here, the pixel signal (PS) may be a correlated double sampling (CDS) signal obtained when the CDS 130 performs CDS processing between a reference signal and an image signal.

Figure 3:
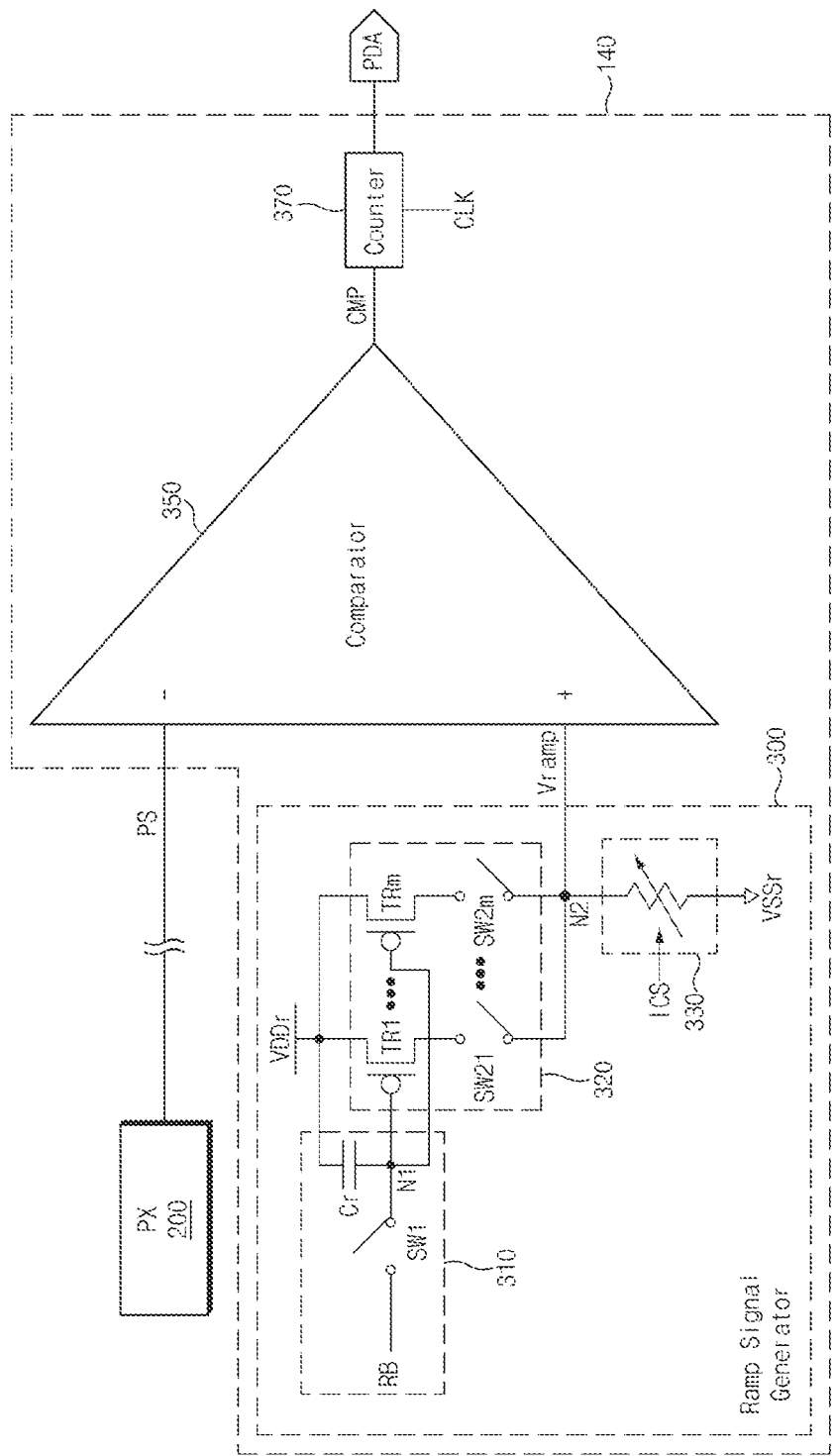
FIG. 3 is a circuit diagram illustrating an example of an internal structure of the ADC shown in FIG. 1 based on some implementations of the disclosed technology.

FIG. 3 is a circuit diagram illustrating an example of an internal structure of the ADC 140 shown in FIG. 1 based on some implementations of the disclosed technology.

Referring to FIG. 3, the ADC 140 is configured to receive the pixel signal (PS) from the pixel 200 and may include a ramp signal generator 300, a comparator 350, and a counter 370. Although not shown in FIG. 3, the correlated double sampler (CDS) 130 may be coupled between the pixel 200 and the ADC 140, and the pixel signal (PS) received by the ADC 140 may be a correlated double sampling (CDS) signal.

The ramp signal generator 300 may generate a ramp signal ($V_{ramp}$), a voltage of which decreases with a slope corresponding to the input range control signal (ICS).

The ramp signal generator 300 may include a ramp bias supply circuit 310, a current generator 320, and a ramp slope controller 330.

The ramp bias supply unit 310 may include a first switch SW1 and a ramp capacitor (Cr).

The first switch SW1 may selectively supply a ramp bias voltage (RB) having a predetermined voltage level to the current generator 320. The first switch SW1 may operate under control of the timing controller 170. The first switch SW1 may be turned on in a time period in which the ramp signal generator 300 is activated, so that the ramp bias voltage (RB) can be supplied to the current generator 320.

Although not shown in the drawings, the ramp bias voltage (RB) may be generated by a bias voltage generator, and the bias voltage generator may include a bandgap reference (BGR) circuit for generating a reference voltage and a gain generator for generating the ramp bias voltage (RB) by controlling a gain of the reference voltage. Other circuit designs may also be implemented to generate the ramp bias voltage (RB).

The ramp capacitor (Cr) may be coupled between a power-supply voltage (VDDr) and a first node N1 to which the first switch SW1 and the current generator 320 are connected, so that the ramp capacitor (Cr) can stabilize a voltage of the first node N1. That is, the ramp capacitor (Cr) may remove noise (e.g., high-frequency noise) that can be included in the ramp bias voltage (RB).

The current generator 320 may generate a current that decreases sequentially over time by receiving a ramp bias voltage (RB) having a predetermined voltage level. The current generator 320 may include a plurality of unit cells connected in parallel to each other. Each unit cell may include transistors TR1~TRm (where 'm' is an integer of 2 or greater) and second switches SW21~SW2m. In FIG. 3, M unit cells are included in the current generator 320.

The first unit cell may include the first transistor TR1 and the second switch SW21

The transistor TR1 may be coupled between the second switch SW21 and the power-supply voltage (VDDr), a gate electrode of which is coupled to the first node N1. The transistor TR1 may transmit, to the second switch SW21, a current corresponding to the ramp bias voltage (RB) supplied to the first node N1. For example, the transistor TR1 may be a P-type metal oxide semiconductor (PMOS) transistor.

The second switch SW21 may be coupled between the transistor TR1 and the second node N2, and may supply a current of the transistor TR1 to the second node N2 under control of the timing controller 170.

Each of the second to m-th unit cells may have a structure and operation corresponding to the first unit cell, and as such redundant description thereof will herein be omitted for brevity. In addition, the transistors TR1~TRm may have the same specifications (e.g., channel width, channel length, etc.), and may thus generate the same magnitude of current upon receiving the same ramp bias voltage (RB).

The current generator 320 may vary or change the number of second switches SW21~SW2m to be turned on according to a control signal of the timing controller 170 when the ramp signal ($V_{ramp}$) is generated. For example, after generation of the ramp signal ($V_{ramp}$) is started, all of the second switches SW21~SW2m may be turned on, and any one of the second switches SW21~SW2m may then be turned off sequentially at intervals of a predetermined time. Thus, the number of second switches to be turned off may increase as time goes by, and all of the second switches SW21~SW2m may be turned off after (m−1) times a predetermined time has elapsed. Therefore, a current flowing into the second node N2 may sequentially decrease as time passes. At this time, since the predetermined time is a very short time, it is assumed that the current flowing into the second node N2 is linearly reduced.

The ramp slope controller 330 may control the slope of the ramp signal ($V_{ramp}$) in response to the input range control signal (ICS). In some implementations, the ramp slope controller 330 may include a variable resistor, a resistance of which is changed depending on the input range control signal (ICS). Here, the variable resistor may be coupled between the second node N2 and a ground voltage (VSSr).

The voltage of the ramp signal ($V_{ramp}$) may flow into the second node N2, and may correspond to a product of a resistance of the variable resistor and a current that flows into the second node N2 and then flows through the variable resistor. When the current flowing into the second node N2 by operation of the current generator 320 linearly decreases, the slope along which the voltage of the ramp signal ($V_{ramp}$) decreases may be determined by the resistance of the variable resistor. For example, as the resistance of the variable resistor increases, the slope of voltage drop of the ramp signal ($V_{ramp}$) may increase. As the resistance of the variable resistor decreases, the slope of voltage drop of the ramp signal ($V_{ramp}$) may decrease.

In addition, the slope of voltage drop of the ramp signal ($V_{ramp}$) may determine the input range of the ADC 140, and a detailed description thereof will be given later with reference to FIG. 4.

The comparator 350 may compare the pixel signal (PS) with the ramp signal ($V_{ramp}$), and may thus generate a comparison signal (CMP) corresponding to the magnitude relationship between the pixel signal (PS) and the ramp signal ($V_{ramp}$). For example, if the pixel signal (PS) is higher in level than the ramp signal ($V_{ramp}$), the comparison signal (CMP) may have a logic low level. Conversely, if the pixel signal (PS) is lower in level than the ramp signal ($V_{ramp}$), the comparison signal (CMP) may have a logic high level.

The counter 370 may perform counting by synchronizing with an edge (e.g., a rising edge or a falling edge) of a clock signal (CLK), and may perform counting until the comparison signal (CMP) transitions from a first level (e.g., a logic high level) to a second level (e.g., a logic low level), so that the counter 370 can output the accumulated counting value as pixel data (PDA). In this case, the clock signal (CLK) may refer to a square wave signal that alternately has a high level and a low level at intervals of a specific time, and may be received from the timing controller 170.

Figure 4:
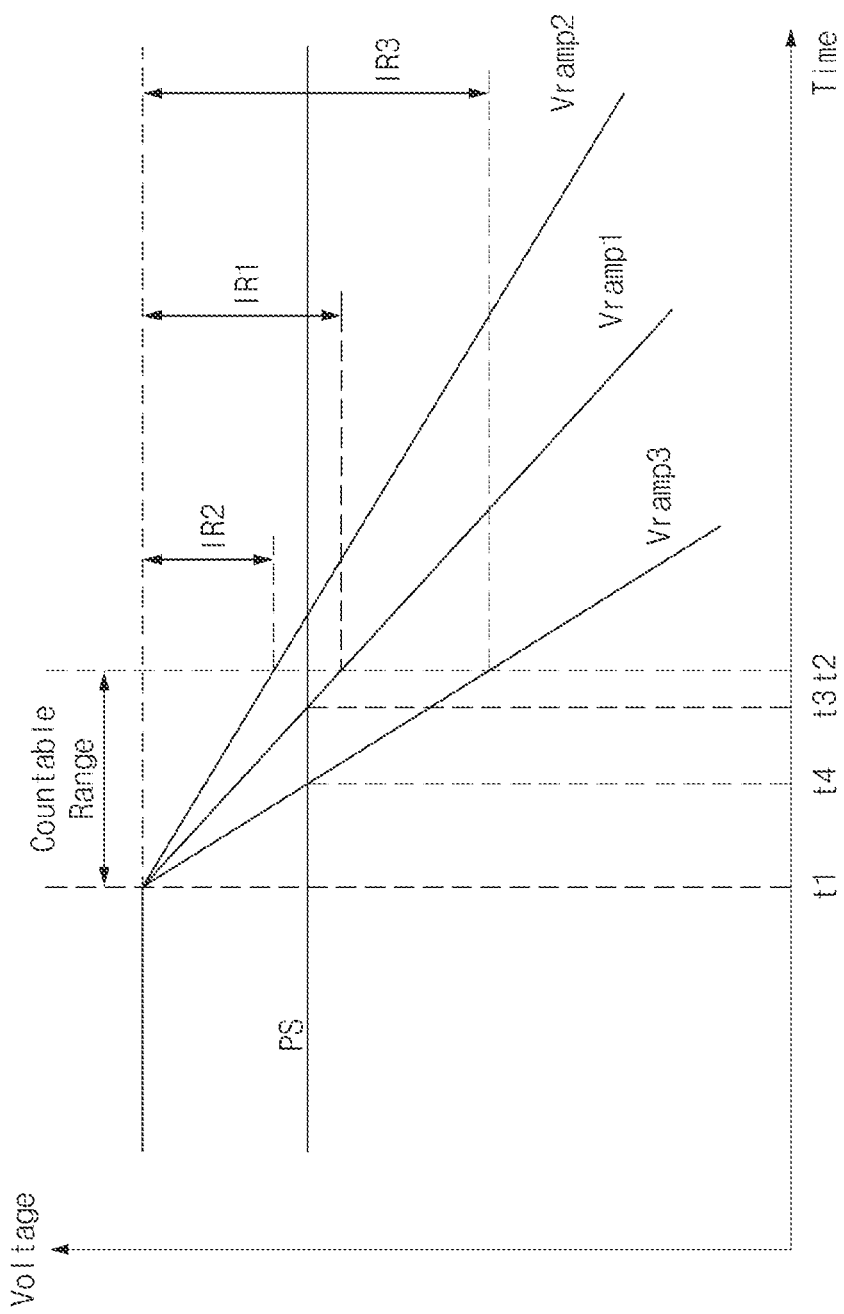
FIG. 4 is a graph illustrating an example of a method for controlling an input range of the ADC shown in FIG. 3 based on some implementations of the disclosed technology.

FIG. 4 is a graph illustrating an example of a method for controlling the input range of the ADC 140 shown in FIG. 3 based on some implementations of the disclosed technology.

In the graph shown in FIG. 4, an X-axis may represent time, and a Y-axis may represent a voltage. In FIG. 4, first to third ramp signals ($V_{ramp1}$~$V_{ramp3}$) are illustrated. Each of the first to third ramp signals ($V_{ramp1}$~$V_{ramp3}$) may have a constant voltage before a first time point (t1), and may linearly decrease after the first time point (t1).

The slope of the second ramp signal ($V_{ramp2}$) may be smaller than the slope of the first ramp signal ($V_{ramp1}$), and the slope of the third ramp signal ($V_{ramp3}$) may be greater than the slope of the first ramp signal ($V_{ramp1}$). If the first ramp signal ($V_{ramp1}$) is generated in a state that a variable resistor has a first resistance value, the second ramp signal ($V_{ramp2}$) can be generated in a state that the variable resistor has a second resistance value less than the first resistance value. In addition, the third ramp signal ($V_{ramp3}$) can be generated in a state that the variable resistor has a third resistance value greater than the first resistance value.

A time period from the first time point (t1) where each of the first to third ramp signals ($V_{ramp1}$~$V_{ramp3}$) begins to linearly decrease to the second time point (t2) that has elapsed from the first time point (t1) by a predetermined time can be defined as a countable range. The countable range may refer to a maximum time period in which the counter 370 shown in FIG. 3 can continuously perform counting, and may correspond to a product of a cycle of the clock signal (CLK) and a maximum number (e.g., 1024) of times of such counting of the counter 370. For convenience of description, the maximum number of times of counting will hereinafter be referred to as a maximum counting number. In this case, the countable range can be defined by the maximum number of times of counting indicating the output range of the ADC 140, and can be determined based on the performance of the counter 370.

For example, when the first ramp signal ($V_{ramp1}$) and the pixel signal (PS) shown in FIG. 4 are input to the comparator 350, the counter 370 may perform counting from the first time point (t1) to a third time point (t3) where the pixel signal (PS) begins to have a value greater than the first ramp signal ($V_{ramp1}$), and may output the accumulated counting value as pixel data (PDA).

In another example, when the second ramp signal ($V_{ramp2}$) and the pixel signal (PS) shown in FIG. 4 are input to the comparator 350, the pixel signal (PS) does not have a higher value than the second ramp signal ($V_{ramp2}$) within the countable range. As a result, the counter 370 may perform counting from the first time point (t1) to the second time point (t2), and may output the accumulated counting value as pixel data (PDA). However, the above counting value may refer to a saturated output value, and may not correspond to pixel data (PDA) obtained by valid conversion of the pixel signal (PS).

In another example, when the third ramp signal ($V_{ramp3}$) and the pixel signal (PS) shown in FIG. 4 are input to the comparator 350, the counter 370 may perform counting from the first time point (t1) to a fourth time point (t4) where the pixel signal (PS) begins to have a value greater than the third ramp signal ($V_{ramp3}$), and may output the accumulated counting value as pixel data (PDA).

As described above, the input range of the ADC 140 may refer to a voltage range of the pixel signal that can be effectively converted into pixel data (PDA) within a predetermined output range (e.g., digital numbers (DNs) of 0~1023) of the ADC 140.

When the first ramp signal ($V_{ramp1}$) is input to the comparator 350, the voltage range of the pixel signal that can be effectively converted into pixel data within a countable range predetermined by the output range of the ADC 140 corresponds to a middle input range (IR1). In the example of FIG. 4, the pixel signal (PS) has the value within the middle input range (IR1) and thus can be effectively converted into pixel data.

When the second ramp signal ($V_{ramp2}$) is input to the comparator 350, the voltage range of the pixel signal that can be effectively converted into pixel data within a countable range predetermined by the output range of the ADC 140 corresponds to a small input range (IR2). In the example of FIG. 4, the pixel signal (PS) has the value not within the small input range (IR2) and thus cannot be effectively converted into pixel data.

When the third ramp signal ($V_{ramp3}$) is input to the comparator 350, the voltage range of the pixel signal that can be effectively converted into pixel data within a countable range predetermined by the output range of the ADC 140 corresponds to a large input range (IR3). In the example of FIG. 4, the pixel signal (PS) has the value within the large input range (IR3) and thus can be effectively converted into pixel data.

As the resistance value of the variable resistor shown in FIG. 3 decreases, the slope of the ramp signal may decrease, so that the input range of the ADC 140 can also be reduced. As the resistance value of the variable resistor shown in FIG. 3 increases, the slope of the ramp signal may increase, so that the input range of the ADC 140 can also increase. Thus, the resistance value of the variable resistor included in the ramp signal generator 300 is adjusted to control the input range of the ADC 140.

In addition, the pixel signal (PS) shown in FIG. 4 can be converted into pixel data that has a larger value when the first ramp signal ($V_{ramp1}$) is input to the comparator 350 as compared to the case when the third ramp signal ($V_{ramp3}$) is input to the comparator 350. This is because the counting operation is performed for a time period from the first time point (t1) to the fourth time point (t4) when the third ramp signal ($V_{ramp3}$) is input to the comparator 350, and the counting operation is performed for a time period from the first time point (t1) to the third time point (t3) when the first ramp signal ($V_{ramp1}$) is input to the comparator 350. Thus, the resistance value of the variable resistor included in the ramp signal 300 is adjusted to control the value of pixel data obtained by conversion of the same pixel signal.

Figure 5:
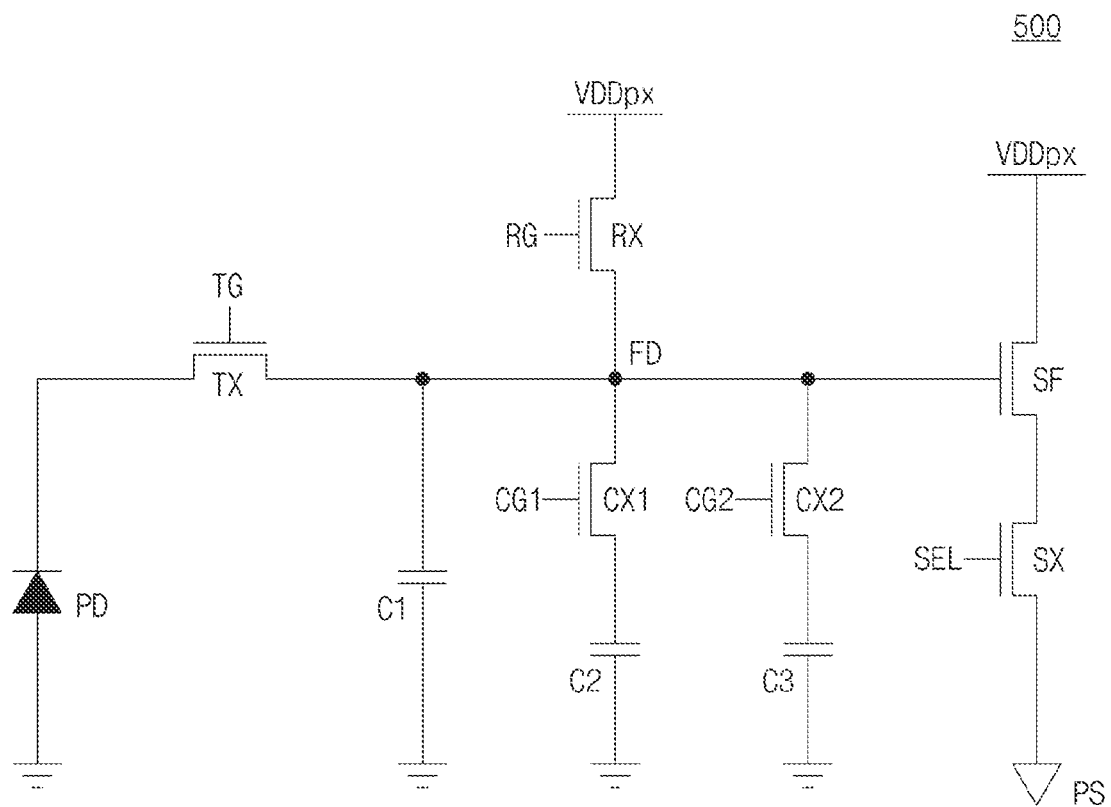
FIG. 5 is a circuit diagram illustrating an example of a pixel based on some implementations of the disclosed technology.

FIG. 5 is a circuit diagram illustrating an example of a pixel 500 based on some implementations of the disclosed technology.

Referring to FIG. 5, the pixel 500 may correspond to an example of any one of pixels included in the pixel array 100.

The pixel 500 may include a photoelectric conversion element (PD), a transfer transistor (TX), a reset transistor (RX), a floating diffusion region (FD), first and second conversion gain (CG) transistors CX1 and CX2, first to third capacitors C1~C3, a source follower transistor (SF), and a selection transistor (SX). Although FIG. 5 illustrates that the pixel 500 includes only one photoelectric conversion element PD for convenience of description, other implementations are also possible. In some other implementations, the pixel 500 may also be a shared pixel including a plurality of photoelectric conversion elements (PDs). In this case, the plurality of transfer transistors (TXs) may be provided in correspondence to the plurality of photoelectric conversion elements (PDs).

Each of the photoelectric conversion elements (PDs) may generate and accumulate photocharges corresponding to the intensity of incident light. For example, each of the photoelectric conversion elements (PDs) may be implemented as a photodiode, a phototransistor, a photogate, or a pinned photodiode or a combination thereof.

If the photoelectric conversion element (PD) is implemented as a photodiode, the photoelectric conversion element (PD) may be a region that is doped with second conductive impurities (e.g., N-type impurities) in a substrate including first conductive impurities (e.g., P-type impurities).

The transfer transistor (TX) may be coupled between the photoelectric conversion element (PD) and the floating diffusion region (FD). The transfer transistor (TX) may be turned on or off in response to a transfer control signal (TG). If the transfer transistor (TX) is turned on, photocharges accumulated in the corresponding photoelectric conversion element (PD) can be transmitted to the floating diffusion region (FD).

The reset transistor (RX) may be coupled between the floating diffusion region (FD) and the power-supply voltage (VDDpx), and the voltage of the floating diffusion region (FD) can be reset to the power-supply voltage (VDDpx) in response to a reset control signal (RG). In this case, although the power-supply voltage (VDDpx) may be the same as the power-supply voltage (VDDr) shown in FIG. 3, other implementations are also possible.

The floating diffusion region (FD) may accumulate photocharges received from the transfer transistor (TX). The floating diffusion region (FD) can be coupled to a first capacitor C1 connected to a ground terminal. For example, the floating diffusion region (FD) may be a region that is doped with second conductive impurities (e.g., N-type impurities) in a substrate (e.g., a P-type substrate) including first conductive impurities. In this case, the substrate and the impurity doped region can be modeled as the first capacitor C1 acting as a junction capacitor.

The first CG transistor CX1 may be coupled between the floating diffusion region (FD) and the second capacitor C2, and may selectively connect the second capacitor C2 to the floating diffusion region (FD) in response to a first DCG control signal CG1.

The second CG transistor CX2 may be coupled between the floating diffusion region (FD) and the third capacitor C3, and may selectively connect the third capacitor C3 to the floating diffusion region (FD) in response to a second DCG control signal CG2.

Each of the second capacitor C2 and the third capacitor C3 may include at least one of a Metal-Insulator-Metal (MIM) capacitor, a Metal-Insulator-Polysilicon (MIP) capacitor, a Metal-Oxide-Semiconductor (MOS) capacitor, and a junction capacitor.

The pixel 500 may operate in three modes, i.e., a high conversion gain (HCG) mode, a middle conversion gain (MCG) mode, and a low conversion gain (LCG) mode.

In this case, the conversion gain (CG) may refer to a ratio for converting the number of photocharges generated in each pixel in response to the intensity of incident light into a voltage of a pixel signal output from the pixel. The conversion gain can be determined by capacitance of the floating diffusion region (FD) in which photocharges are accumulated and converted into a pixel signal.

Assuming that the capacitance of the floating diffusion region (FD) is relatively small, when predetermined photocharges are accumulated in the floating diffusion region (FD), a voltage change of the floating diffusion region (FD) may be relatively large, so that a voltage change of the electrical signal generated by the source follower transistor (SF) may also be relatively large, resulting in an increase in a conversion gain (CG) of the pixel 500. Conversely, assuming that the capacitance of the floating diffusion region (FD) is relatively large, when predetermined photocharges are accumulated in the floating diffusion region (FD), a voltage change of the floating diffusion region (FD) may be relatively small, so that a voltage change of the electrical signal generated by the source follower transistor (SF) may also be relatively small, resulting in reduction in a conversion gain (CG) of the pixel 500.

The high conversion gain (HCG) mode may refer to a mode in which the amount of increase in response of the pixel in response to an increase in the intensity of incident light is relatively large. Here, the response may refer to a pixel signal generated by the pixel 500 in response to sensing the intensity of incident light. Thus, the HCG mode may refer to an operation mode having a relatively high sensitivity to the incident light, and the HCG mode may be a mode appropriate for capturing a scene with low illuminance. When the pixel 500 operates in the HCG mode, each of the first CG transistor CX1 and the second CG transistor CX2 may be turned off, and the floating diffusion region (FD) may be coupled to the first capacitor C1, so that the floating diffusion region (FD) may have capacitance corresponding to the first capacitor C1.

The low conversion gain (LCG) mode may refer to a mode in which the amount of increase in response of the pixel in response to an increase in the intensity of incident light is relatively small. Thus, the LCG mode may refer to an operation mode having a relatively low sensitivity to the incident light, and the LCG mode may be a mode appropriate for capturing a scene with high illuminance. When the pixel 500 operates in the LCG mode, each of the first CG transistor CX1 and the second CG transistor CX2 may be turned on, and the floating diffusion region (FD) may be coupled to the first to third capacitors C1~C3, so that the floating diffusion region (FD) may have capacitance corresponding to the sum of capacitances of the first to third capacitors C1~C3 coupled in parallel to each other.

The middle conversion gain (MCG) mode may refer to a mode in which the amount of increase in response of the pixel in response to an increase in the intensity of incident light is relatively medium. Thus, the MCG mode may refer to an operation mode in which a sensitivity to the incident light is interposed between the sensitivity of the HCG mode and the sensitivity of the LCG mode, and the MCG mode may be a mode appropriate for capturing a scene with medium illuminance. To this end, when the pixel 500 operates in the MCG mode, the first CG transistor CX1 may be turned on and the second CG transistor CX2 may be turned off, and the floating diffusion region (FD) may be coupled to the first and second capacitors C1~C2, so that the floating diffusion region (FD) may have capacitance corresponding to the sum of capacitances of the first and second capacitors C1~C2 coupled in parallel to each other. Here, the medium illuminance may refer to an illuminance condition in which the intensity of incident light is distributed in various illuminance ranges from the high illuminance range to the low illuminance range without being biased to a specific illuminance range such as a high illuminance or a low illuminance.

Capacitances of the first to third capacitors C1~C3 may be predetermined experimentally to satisfy the sensitivity required for the HCG mode, the sensitivity required for the MCG mode, and the sensitivity required for the LCG mode.

A high dynamic range (HDR) can be implemented using a response of the HCG mode appropriate for low illuminance, a response of the MCG mode appropriate for medium illuminance, and a response of the LCG mode appropriate for high illuminance. As compared to the case of using only one mode, when the HCG mode, the MCG mode, and the LCG mode are simultaneously used, the pixel 500 may have a high dynamic range (HDR) corresponding to a range from a minimum value (i.e., the lowest value) of the dynamic range of the HCG mode to a maximum value (i.e., the highest value) of the dynamic range of the LCG mode. In this case, the dynamic range may refer to a range of the intensity of incident light (or photocharges) that enables the pixel 500 to have a valid response (i.e., a response indicating the intensity of incident light).

The source follower transistor (SF) may be coupled between the selection transistor (SX) and the power-supply voltage (VDDpx), may amplify a change in electrical potential of the floating diffusion region (FD) that has received photocharges accumulated in the photoelectric conversion element (PD), and may transmit the amplified result to the selection transistor (SX).

The selection transistor (SX) may be coupled between the source follower transistor (SF) and the output signal line, and may be turned on by the selection control signal (SEL), so that the selection transistor (SX) can output the electrical signal received from the source follower transistor (SF) as the pixel signal (PS).

Although FIG. 5 illustrates the pixel designed to use three different conversion gains, other implementations are also possible as long as the pixel uses at least two different conversion gains.

The structure of the pixel designed to use three different conversion gains shown in FIG. 5 is merely an example, and other implementations are also possible.

Figure 6:
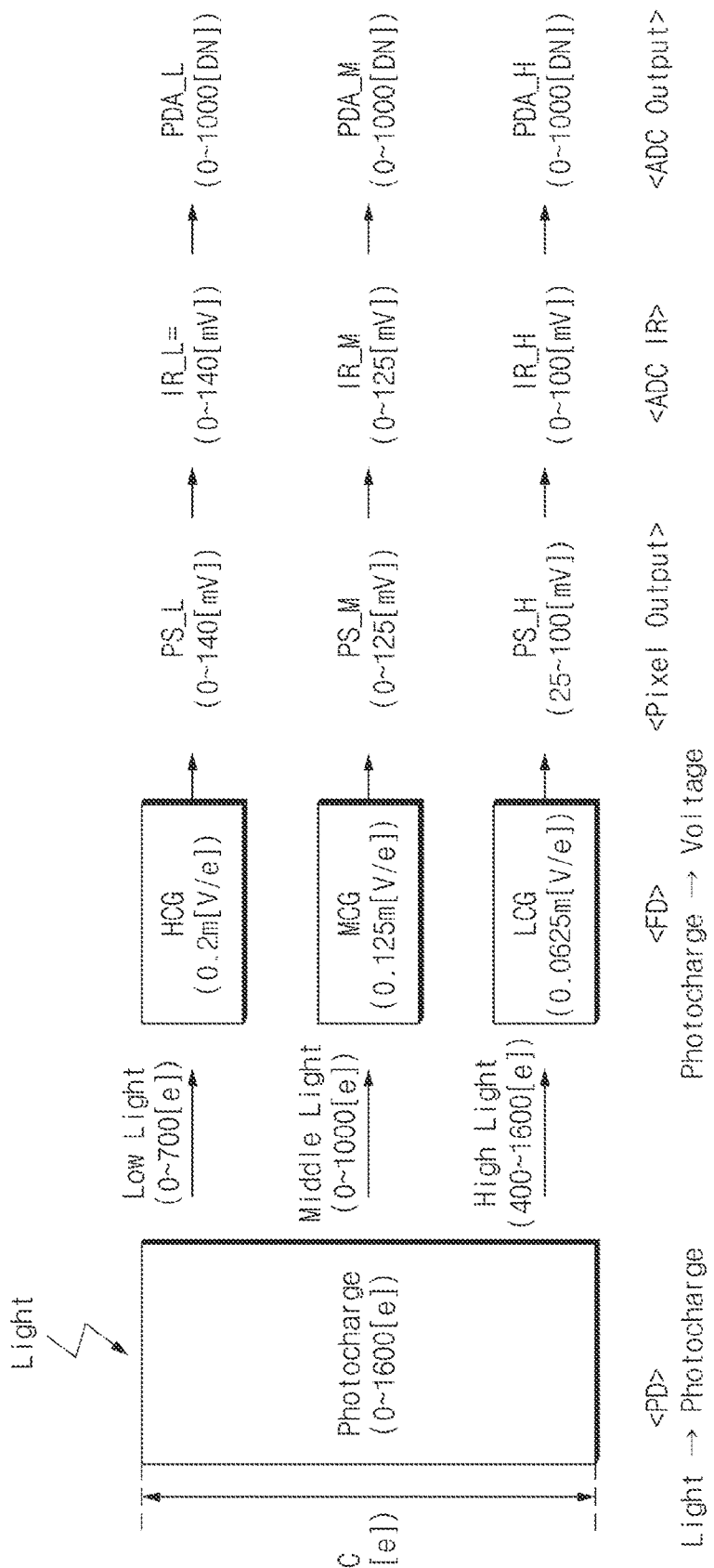
FIG. 6 is a conceptual diagram illustrating an example of a method for controlling an input range of the ADC for the pixel shown in FIG. 5 based on some implementations of the disclosed technology.
Figure 7A:
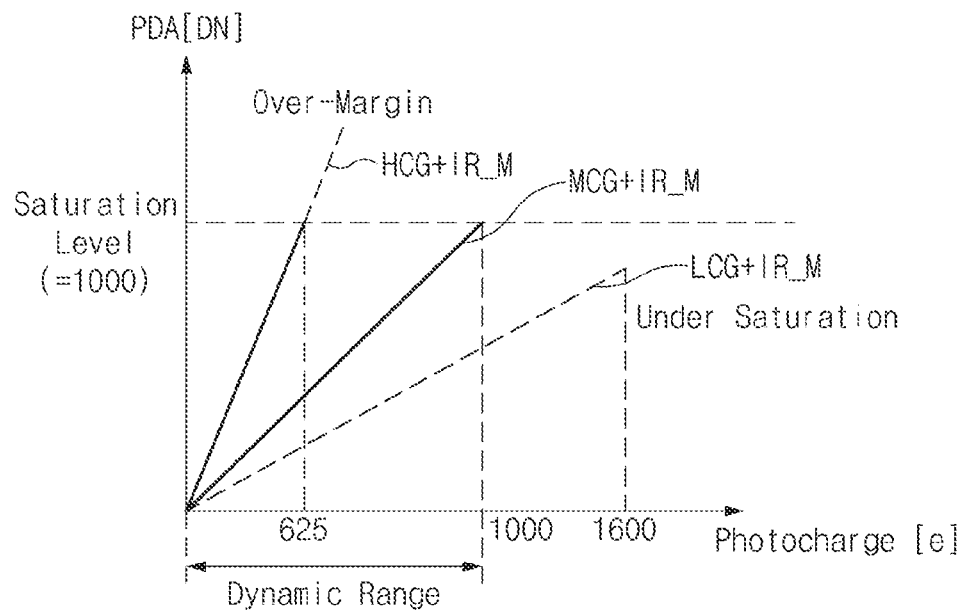
FIG. 7A is a graph illustrating an example of a dynamic range implemented by a comparative example of the disclosed technology.
Figure 7B:
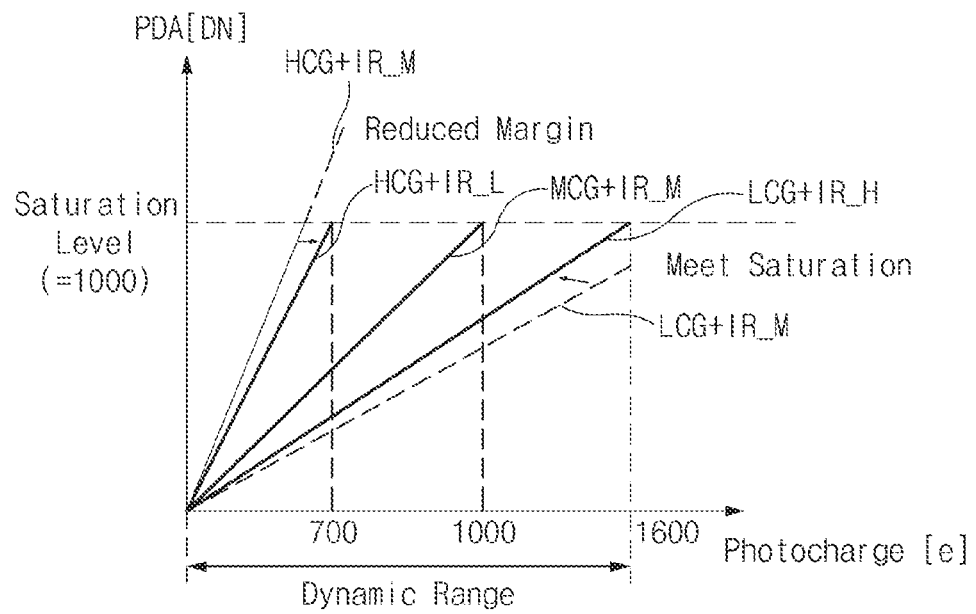
FIG. 7B is a graph illustrating an example of a dynamic range implemented by one implementation of the disclosed technology.

FIG. 6 is a conceptual diagram illustrating an example of a method for controlling an input range of the ADC for the pixel shown in FIG. 5. FIG. 7A is a graph illustrating an example of a dynamic range implemented by a comparative example of the disclosed technology. FIG. 7B is a graph illustrating an example of a dynamic range implemented by one implementation of the disclosed technology.

Referring to FIG. 6, it is assumed that linear well capacity (LWC) of the photoelectric conversion element (PD) included in the pixel 500 is set to 1600[e]. The linear well capacity (LWC) may refer to photocharge storage capacity that indicates a maximum amount of photocharges capable of being generated and accumulated within a predefined range where a response of the photoelectric conversion element (PD) can be converted into a valid response. Therefore, assuming that the amount of photocharges accumulated in the photoelectric conversion element (PD) is within the linear well capacity (LWC), the corresponding response for the amount of photocharges (or the intensity of incident light) may have linearity. Unlike the LWC concept, a full well capacity (FWC) may refer to photocharge storage capacity that indicates a maximum amount of photocharges capable of being maximally generated and accumulated by the photoelectric conversion element (PD). Thus, the photoelectric conversion element (PD) can accumulate (or store) the amount of photocharges ranging from the LWC to the FWC therein but a response corresponding to the amount of photocharges ranging from the LWC to the FWC may have non-linearity and the corresponding response to the amount of photocharges ranging from the LWC to the FWC may be invalid.

With regard to FIG. 6, the photoelectric conversion element (PD) can accumulate and store the amount of photocharges in the range of 0~1600 in response to the intensity of incident light. Hereinafter, for convenience of description and better understanding of the disclosed technology, the amount of photocharges in the range of 0~1600 will hereinafter be referred to as 0~1600 photocharges.

The implementations of FIGS. 6 to 7B are disclosed using specific numerical values but those values are examples only and other values are also possible.

It is assumed that 0~700 photocharges can be accumulated at a low-illuminance condition (also called a low-light condition) in which the intensity of incident light is relatively weak, it is assumed that 400~1600 photocharges can be accumulated at a high-illuminance condition (also called a high-light condition) in which the intensity of incident light is relatively strong, and it is also assumed that 0~1000 photocharges can be accumulated at a middle-illuminance condition (also called a middle-light condition) in which the intensity of incident light is distributed in various ranges.

It is assumed that, in the low-illuminance condition, the pixel 500 operates in the HCG mode appropriate for low illuminance and the conversion gain of the HCG mode is set to 0.2 mV/e. It is assumed that, in the high-illuminance condition, the pixel 500 operates in the LCG mode appropriate for high illuminance and the conversion gain of the LCG mode is set to 0.0625 mV/e. It is assumed that, in the middle-illuminance condition, the pixel 500 operates in the MCG mode appropriate for medium illuminance and the conversion gain of the MCG mode is set to 0.125 mV/e. In this case, the conversion gain of 1 mV/e may refer to a gain capable of converting only one photocharge into a pixel signal of 1 mV.

0~700 photocharges accumulated in the low-illuminance condition can be converted into a pixel signal (PS_L) of 0~140 mV within the floating diffusion region (FD) corresponding to the conversion gain of 0.2 mV/e. 400~1600 photocharges accumulated in the high-illuminance condition can be converted into a pixel signal (PS_H) of 25~100 mV within the floating diffusion region (FD) corresponding to the conversion gain of 0.0625 mV/e. 0~1000 photocharges accumulated in the middle-illuminance condition can be converted into a pixel signal (PS_M) of 0~125 mV within the floating diffusion region (FD) corresponding to the conversion gain of 0.125 mV/e.

In the descriptions below, it is assumed that the output range of the ADC 140 is set to 0~1000 [DN].

It is also assumed that as a comparative example of the disclosed technology, the input range of the ADC 140 is fixed to a third input range (IR_M) of 0~125 mV. In the comparative example, since the input range of the ADC 140 is fixed to a third input range (IR_M) of 0~125 mV, the pixel signal (PS_M) of 0~125 mV, which is obtained in the middle-illuminance condition, can be effectively converted into pixel data (PDA_M) of 0~1000[DN] throughout the entire range.

However, for the pixel signal (PS_L) of 0~140 mV which is obtained in the low-illuminance condition, only the portion of the pixel signal (PS_L) which corresponds to 0~125 mV that is within the third input range (IR_M) of the ADC 140 can be effectively converted into pixel data (PDA_L) of 0~1000[DN], and the remaining portion of pixel signal (PS_L) exceeding 125 mV may remain in a margin without being effectively converted into pixel data (PDA_L). In this case, the margin may refer to the range of either photocharges or pixel signals that cannot be effectively converted into pixel data. As the margin increases, the dynamic range of the image sensing device 100 becomes to be reduced in size.

For the pixel signal (PS_H) of 25~100 mV which is obtained in the high-illuminance condition, since the range of 25~100 mV is within the third input range (IR_M), i.e., 0~125 mV, the entire pixel signal (PS_H) of 25~100 mV can be effectively converted into pixel data (PDA_H). Given that the pixel signal (PS_M) of 0~125 mV is converted into pixel data (PDA_M) of 0 to 1000[DN], it is assumed that the pixel data (PDA_H) corresponding to the pixel signal (PS_H) has a range of 200~800[DN]. In this case, a maximum value (800 [DN]) of the pixel data (PDA_H) does not reach a maximum value (1000 [DN]) of the output range of the ADC 140. If photocharges exceeding 1600[e] indicating a linear well capacity (LWC) are accumulated in the photoelectric conversion element (PD), the pixel signal (PS_H) and the pixel data (PDA_H) that correspond to the photocharges exceeding 1600[e] may have non-linearity, so that the corresponding response may be considered as an invalid response. The pixel data (PDA_H) capable of including an invalid response may be considered to be unreliable data. In this case, the pixel data (PDA_H) may substantially be unavailable data, so that the entirety of the pixel data (PDA_H) can be processed as an invalid response.

Thus, assuming that a maximum value (800 [DN]) of the pixel data (PDA_H) corresponding to the LWC (1600[e]) of the photoelectric conversion element (PD) does not reach a maximum value (1000 [DN]) of the output range of the ADC 140, the entire pixel data (PDA_H) can be processed as an invalid response.

In FIG. 7A, as can be seen from the graph in which the X-axis represents the amount of photocharges and the Y-axis represents pixel data (PDA), a pixel response in the low-illuminance condition, a pixel response in the middle-illuminance condition, a pixel response in the high-illuminance condition according to comparative examples of the disclosed technology are illustrated in the graph of FIG. 7A. In FIG. 7A, a saturation level may refer to a maximum value of pixel data that can be output from the ADC 140. In the above-described example, the saturation level may be set to 1000[DN]. In the following description, the respective responses shown in FIG. 7A will hereinafter be described with reference to the above-described examples.

First, in the low-illuminance condition in which 0~700 photocharges are generated, a response (HCG+IR_M) obtained when the photocharges are converted into pixel data with a high conversion gain (HCG) and the third input range (IR_M) can be classified into a valid response corresponding to 0~625 photocharges and an invalid response corresponding to 626~700 photocharges. When 700 photocharges are converted into pixel data with the high conversion gain (HCG), which is assumed as 0.2 mV/e, a pixel signal of 0~140 my can be obtained. Since the ADC 140 has the third input range (IR_M), which is 0~125 mV, the range between 0~125 mV (corresponding to 0~625 photocharges) correspond to the valid response and the range between 125~140 mV (corresponding to 626~700 photocharges) correspond to the invalid response. Here, the valid response (which is denoted by a solid line) may refer to a response corresponding to the intensity of incident light and capable of indicating the intensity of incident light, and the invalid response (which is denoted by a dotted line) may refer to a response not corresponding to the intensity of incident light and incapable of indicating the intensity of incident light. The pixel signal (PS_L) obtained when more than 625 photocharges are converted into a high conversion gain (HCG) may exceed the third input range (IR_M) of the ADC 140, which results in the margin of the pixel signal (PS_L).

In the middle-illuminance condition in which 0~1000 photocharges are generated, a response (MCG+IR_M) obtained when the photocharges are converted into pixel data with a middle conversion gain (MCG) and the third input range (IR_M) may include a valid response (denoted by a solid line) corresponding to 0~1000 photocharges. In the middle-illuminance condition, photocharges can be effectively converted into pixel data without resulting in the margin.

In the high-illuminance condition in which 400~1600 photocharges are generated, a response (LCG+IR_M) obtained when the photocharges are converted into pixel data with a low conversion gain (LCG) and the third input range (IR_M) may include an invalid response (denoted by a dotted line) corresponding to 400~1600 photocharges. This is because the response (LCG+IR_M) does not reach the saturation level (i.e., under saturation) and the entire response corresponding to 400~1600 photocharges corresponds to an invalid response.

Accordingly, according to comparative examples of the disclosed technology, the dynamic range of the pixel 500 that has operated in each of the HCG mode, the MCG mode, and the LCG mode may correspond to a range of 0~1000 photocharges. Here, this range of 0~1000 photocharges may be smaller in size than the range of 0~1600 photocharges capable of being accumulated in the photoelectric conversion element (PD).

In the below, unlike the comparative example case, the implementation based on the disclosed technology will be explained, in which the input range of the ADC 140 is changed for each mode.

If the operation mode of the pixel 500 is set to the MCG mode, the input range of the ADC 140 may be set to the third input range (IR_M) of 0~125 mV. The pixel signal (PS_M) of 0~125 mV generated in the middle-illuminance condition in which 0~1000 photocharges can be generated can be effectively converted into pixel data (PDA_M) of 0~1000 [DN] throughout the entire range.

If the operation mode of the pixel 500 is set to the HCG mode, the input range of the ADC 140 may be set to the first input range (IR_L) of 0~140 mV. The pixel signal (PS_L) of 0~140 mV generated in the low-illuminance condition in which 0~700 photocharges can be generated can be effectively converted into pixel data (PDA_L) of 0~1000[DN] throughout the entire range. In the HCG mode, if the input range of the ADC 140 is set to the first input range (IR_L), a margin does not occur since entire photocharges or entire pixel signal can be effectively converted into pixel data by the ADC 140.

If the operation mode of the pixel 500 is set to the LCG mode, the input range of the ADC 140 may be set to the second input range (IR_H) of 0~100 mV. The pixel signal (PS_H) of 25~100 mV generated in the high-illuminance condition in which 400~1600 photocharges can be generated can be effectively converted into pixel data (PDA_H) of 250~1000[DN] throughout the entire range. In the LCG mode, if the input range of the ADC 140 is set to the second input range (IR_H), a maximum value (1000 [DN]) of the pixel data (PDA_H) can reach a maximum value (1000 [DN]) of the output range of the ADC 140, so that the pixel data (PDA_H) of 250~1000[DN] can be used as valid data.

The method for varying (or changing) the input range of the ADC 140 has already been disclosed in FIGS. 3 and 4, and as such redundant description thereof will herein be omitted for convenience of description.

In FIG. 7B, as can be seen from the graph in which the X-axis represents the amount of photocharges and the Y-axis represents pixel data (PDA), a pixel response in the low-illuminance condition, a pixel response in the middle-illuminance condition, a pixel response in the high-illuminance condition based on some implementations of the disclosed technology are illustrated in the graph of FIG. 7B. In addition, in order to explain the effects of the embodiments of the disclosed technology, other responses obtained by comparative examples of the disclosed technology are further illustrated in FIG. 7B.

First, in the low-illuminance condition in which 0~700 photocharges are generated, a response (HCG+IR_L) obtained when the photocharges are converted into pixel data with a high conversion gain (HCG) and a first input range (IR_L) may include a valid response (denoted by a solid line) corresponding to 0~700 photocharges. In other words, unlike the response (HCG+IR_M) shown in FIG. 7A, the response (HCG+IR_L) of FIG. 7B may not include a margin. The margin may increase power consumption without contributing to extension of the dynamic range, so that it may be preferable that the margin be minimized.

In the middle-illuminance condition in which 0~1000 photocharges are generated, a response (MCG+IR_M) obtained when the photocharges are converted into pixel data with a middle conversion gain (MCG) and a third input range (IR_M) may include a valid response (denoted by a solid line) corresponding to 0~1000 photocharges. In other words, in the middle-illuminance condition, the photocharges can be effectively converted into pixel data throughout the entire range of such photocharges.

In the high-illuminance condition in which 400~1600 photocharges are generated, a response (LCG+IR_H) obtained when the photocharges are converted into pixel data with a low conversion gain (LCG) and a second input range (IR_H) may include a valid response (denoted by a solid line) corresponding to 400~1600 photocharges. In other words, unlike the response (LCG+IR_M) shown in FIG. 7A, the response (LCG+IR_H) of FIG. 7B reaches a saturation level as represented by "Meet Saturation" in FIG. 7B, so that the entire response corresponding to 400~1600 photocharges may correspond to a valid response. Therefore, as compared to FIG. 7A, the dynamic range may extend to the range of photocharges exceeding 1000 photocharges.

Accordingly, in some implementations of the disclosed technology, the dynamic range of the pixel 500 that has operated in each of the HCG mode, the MCG mode, and the LCG mode may correspond to a range of 0~1600 photocharges. This range of 0~1600 photocharges may refer to a photocharge range in which the photoelectric conversion element (PD) can accumulate 0~1600 photocharges.

In addition, in some implementations of the disclosed technology, one index (i.e., 'Kadc' value) from among various indexes indicating performance of the image sensing device 100 can be improved. Here, the 'Kadc' value may refer to a conversion efficiency that is capable of converting received photocharges into pixel data. Considering the performance of the image sensing device 100, it may be desirable that the 'Kadc' value be adjusted to be uniformly maintained over the entire range of pixel data. The 'Kadc' value may be proportional to the input range of the ADC 140, and may be inversely proportional to the conversion gain (mV/e). In some implementations, as the conversion gain increases (for example, in the order of LCG→MCG→HCG), the input range of the ADC 140 is controlled to sequentially increase. As a result, the input range of the ADC 140 for each operation mode can be determined in a manner that the 'Kadc' value becomes uniform irrespective of the operation modes.

For the range of 0~700 photocharges, both of the response (HCG+IR_L) and the response (MCG+IR_M) may have a valid response. However, the larger the amount of increase in pixel data compared to the amount of increase in photocharges, the better the signal-to-noise ratio (SNR) and resolution of pixel data. As a result, the response (HCG+IR_L) of FIG. 7B can be used to synthesize the HDR image.

Similarly, for the range of 700~1000 photocharges, both of the response (MCG+IR_M) and the response (LCG+IR_H) may have a valid response, but the response (MCG+IR_M) can be used to synthesize the HDR image.

FIG. 8A is a diagram illustrating an example of an operation scheme of the pixel array 110 shown in FIG. 1. FIG. 8B is a diagram illustrating another example of an operation scheme of the pixel array 110 shown in FIG. 1.

When the pixel array 110 operates in a single mode, a portion 800a of the corresponding pixel array 110 is illustrated in FIG. 8A. In this case, the single mode may refer to an operation mode in which a pixel signal output from the pixel included in the pixel array 110 corresponds to photocharges that are generated and accumulated in only one photoelectric conversion element.

The portion 800a of the pixel array 110 may include a plurality of single pixels (S11~S48) arranged in a (4×8) matrix array. The pixel array 110 may have a structure in which the single pixels included in the portion 800a of the pixel array 110 are arranged in a matrix array including a predetermined number of rows and a predetermined number of columns. In FIG. 8A, in the symbol 'Sab' indicating each of the single pixels, 'a' may refer to a row to which the corresponding single pixel belongs, and 'b' may refer to a column to which the corresponding single pixel belongs. For example, the single pixel 'S34' may indicate that the corresponding single pixel belongs to a third row and a fourth column.

In a single mode, each of the single pixels S11~S48 may generate and output a pixel signal corresponding to photocharges that are generated and accumulated in only one photoelectric conversion element.

Referring to FIG. 8B, when the pixel array 110 operates in a binning mode, a portion 800b of the corresponding pixel array 110 is illustrated. The binning mode may refer to an operation mode in which a pixel signal output from the pixel included in the pixel array 110 corresponds to photocharges that are generated and accumulated in a plurality of photoelectric conversion elements.

The portion 800b of the pixel array 110 may include a plurality of binning pixels (B11~B28) arranged in a (2×8) matrix array. The pixel array 110 may have a structure in which the binning pixels included in the portion 800b of the pixel array 110 are arranged in a matrix array including a predetermined number of rows and a predetermined number of columns. In FIG. 8B, in the symbol 'Bab' indicating each of the binning pixels, 'a' may refer to a row to which the corresponding binning pixel belongs, and 'b' may refer to a column to which the corresponding binning pixel belongs. For example, the binning pixel 'B24' may indicate that this binning pixel belongs to a second row and a fourth column.

When the pixels corresponding to the same region operate not only in the single mode but also in the binning mode, the portion 800a of the pixel array 110 may refer to some pixels, each of which serves as an operation unit in the single mode, and the portion 800b of the pixel array may refer to some pixels, each of which serves as an operation unit in the binning mode. For example, when the single pixels S11 and S21 and the binning pixel B11 belong to the same region, the single mode may be activated on the basis of the single pixels S11 and S21, and the binning mode may be activated on the basis of the binning pixel B11.

In the binning mode, each of the binning pixels B11~B28 may generate a pixel signal corresponding to photocharges that are generated and accumulated in two photoelectric conversion elements. Although the above-mentioned example has disclosed that each binning pixel for use in the binning mode generates a pixel signal corresponding to photocharges of two photoelectric conversion elements for convenience of description, other implementations are also possible, and it should be noted that each binning pixel for use in the binning mode can also generate a pixel signal corresponding to photocharges of three or more photoelectric conversion elements.

Figure 8C:
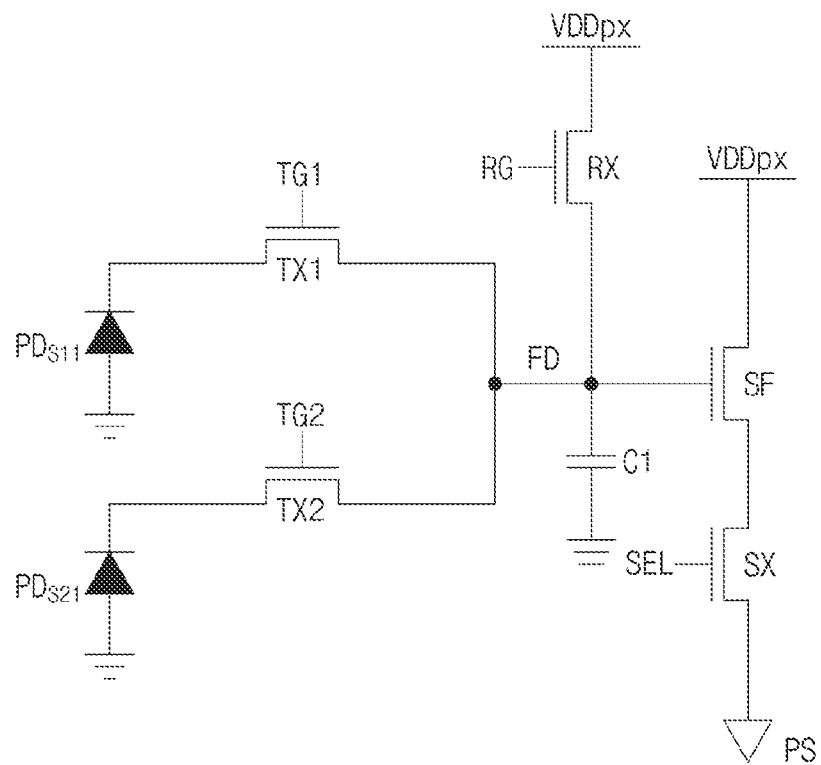
FIG. 8C is a circuit diagram illustrating an example of a pixel that can operate as a single pixel shown in FIG. 8A and/or a binning pixel shown in FIG. 8B.

FIG. 8C is a circuit diagram illustrating an example of the pixel that can operate as a single pixel shown in FIG. 8A and/or a binning pixel shown in FIG. 8B.

Referring to FIG. 8C, the pixel 800c may correspond to either the single pixels S11 and S21 or the binning pixel B11. In other words, the pixel 800c may operate as two single pixels S11 and S21 in the single mode, or may operate as the binning pixel B11 in the binning mode. Although FIG. 8C illustrates the single pixels S11 and S21 or the binning pixel B11, other implementations are also possible, and it should be noted that other single pixels or other binning pixels are configured to have a structure and operation corresponding to those of the pixel 800c.

The pixel 800c may include first and second photoelectric conversion elements $PD_{s11}$ and $PD_{s21}$, first and second transfer transistors TX1 and TX2, a floating diffusion region (FD), a reset transistor (RX), a source follower transistor (SF), and a selection transistor (SX). The operation and functions of the above constituent elements of the pixel 800c shown in FIG. 8C are substantially the same as those of the pixel 500 shown in FIG. 5. For convenience of description, the pixel 800c shown in FIG. 8C will hereinafter be described centering upon characteristics different from those of the pixel 500 shown in FIG. 5.

The pixel 800c may include two photoelectric conversion elements $PD_{s11}$ and $PD_{s21}$ and two transfer transistors TX1 and TX2. Photocharges generated by the first photoelectric conversion element $PD_{s11}$ can be transmitted to the floating diffusion region (FD) through the first transfer transistor TX1, and photocharges generated by the second photoelectric conversion element $PD_{s21}$ can be transmitted to the floating diffusion region (FD) through the second transfer transistor TX2. The floating diffusion region (FD) may be simultaneously coupled to the photoelectric conversion elements $PD_{s11}$ and $PD_{s21}$ according to operations of the transfer transistors TX1 and TX2, or may be coupled to any one of the photoelectric conversion elements $PD_{s11}$ and $PD_{s21}$.

The floating diffusion region (FD) may be coupled to the first capacitor (C1). Differently from FIG. 5, although the first and second CG transistors CX1 and CX2 and the second and third capacitors C2 and C3 shown in FIG. 5 are omitted from FIG. 8C, it should be noted that at least one CG transistor can be coupled to the floating diffusion region (FD) according to another embodiment.

The first photoelectric conversion element ($PD_{s11}$) may be included in the single pixel S11, and the second photoelectric conversion element ($PD_{s21}$) may be included in the single pixel S21. In other words, the binning pixel B11 may include the first photoelectric conversion element ($PD_{s11}$) and the second photoelectric conversion element ($PD_{s21}$).

During the single mode, in a first readout section, photocharges accumulated in the first photoelectric conversion element ($PD_{s11}$) may be transmitted to the floating diffusion region (FD), so that a pixel signal corresponding to an electrical potential of the floating diffusion region (FD) can be generated and output. In a second readout section, photocharges accumulated in the second photoelectric conversion element ($PD_{s21}$) may be transmitted to the floating diffusion region (FD), so that a pixel signal corresponding to an electrical potential of the floating diffusion region (FD) can be generated and output. That is, during the single mode, photocharges generated by the first photoelectric conversion element ($PD_{s11}$) can be converted into an electrical signal so that the electrical signal is then output, and photocharges generated by the second photoelectric conversion element ($PD_{s21}$) can be converted into an electrical signal so that the electrical signal is then output. In brief, the electrical signal from the photocharges generated by the first photoelectric conversion element ($PD_{s11}$) and the electrical signal from the photocharges generated by the second photoelectric conversion element ($PD_{s21}$) can be output independently from each other.

During the binning mode, in only one readout section, photocharges accumulated in the first photoelectric conversion element ($PD_{s11}$) and photocharges accumulated in the second photoelectric conversion element ($PD_{s21}$) are simultaneously transmitted to the floating diffusion region (FD), so that a pixel signal corresponding to an electrical potential of the floating diffusion region (FD) can be generated and output. That is, during the binning mode, the photocharges generated by the first photoelectric conversion element ($PD_{s11}$) and the photocharges generated by the second photoelectric conversion element (PD$_{s21}$) may be simultaneously converted into electrical signals, so that the electrical signals are then output.

In the binning mode, whereas a resolution of the binning mode can be reduced to a half a resolution of the single mode, a processing time to be consumed for forming only one frame can be reduced to a half a processing time of the single mode, and the binning mode can be more preferably used to form pixel data that is considered valid in the low-illuminance condition having a smaller amount of light. Accordingly, the timing controller 170 may select the mode of the pixel array 110 under control of an external device (e.g., an image processor) or under control of a predefined algorithm.

Figure 9:
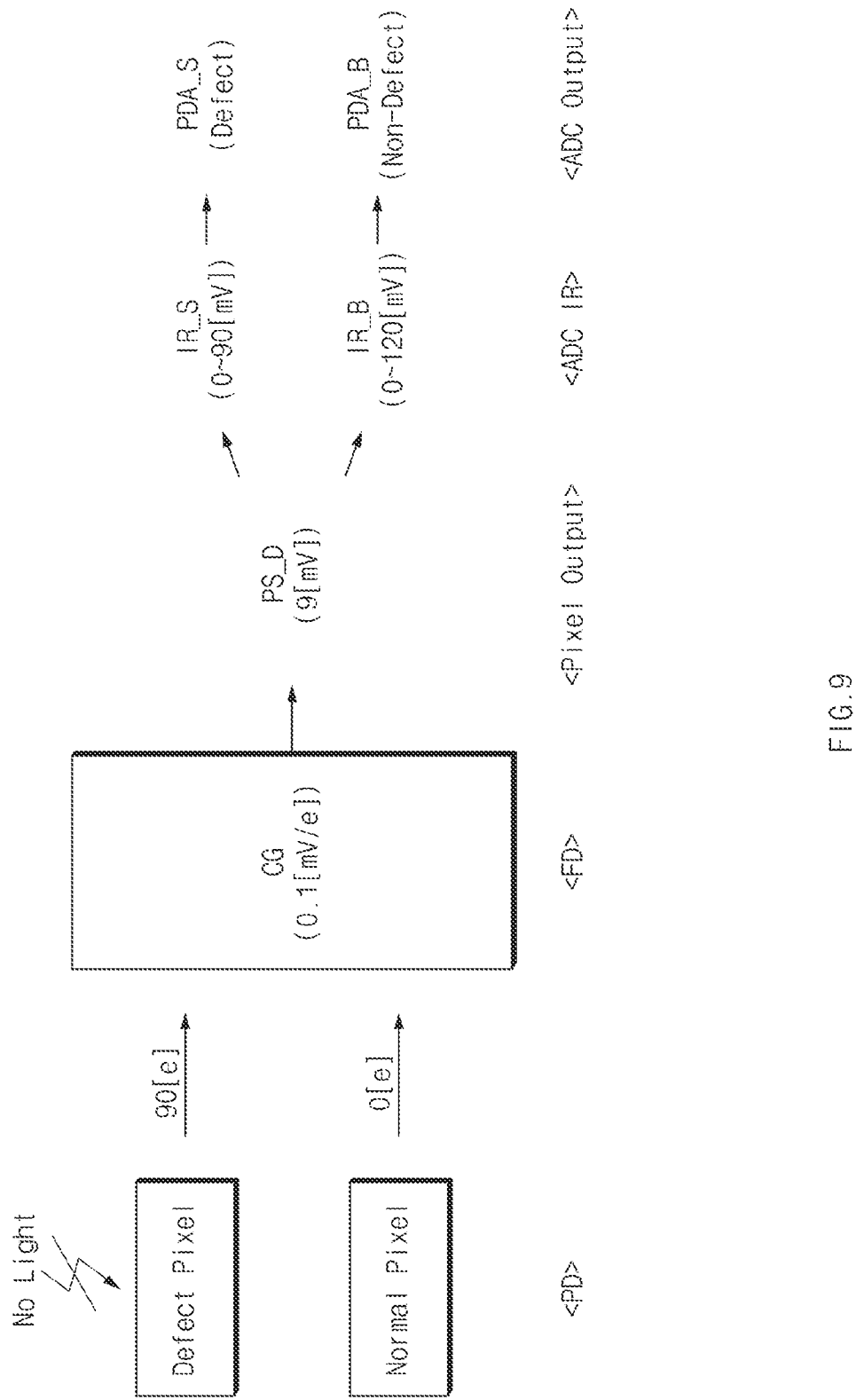
FIG. 9 is a conceptual diagram illustrating an example of a method for controlling an input range of the ADC for the pixel shown in FIG. 8C based on some implementations of the disclosed technology.

FIG. 9 is a conceptual diagram illustrating an example of a method for controlling the input range of the ADC 140 for the pixel 800c shown in FIG. 8C.

A defective pixel (denoted by 'Defect Pixel') and a normal pixel are illustrated in FIG. 9. Each of the defective pixel and the normal pixel may serve as the single pixel described above.

The defective pixel may refer to a pixel in which, even in a dark condition (i.e., a no-light condition) having no incident light, photocharges (e.g., 90[e]) of at least a reference amount of photocharges can be accumulated in a photoelectric conversion element due to a defect (e.g., occurrence of a dark current, etc.) of the pixel itself. Conversely, the normal pixel may refer to a pixel in which no photocharges are accumulated in the dark condition, or may refer to a pixel in which photocharges of less than a reference amount of photocharges are accumulated in the dark condition. In other words, even when photocharges less than the reference amount of photocharges are accumulated, the corresponding pixel can be determined to be a normal pixel, but it is assumed that it is impossible for the normal pixel of FIG. 9 to accumulate photocharges therein for convenience of description and better understanding of the disclosed technology. In this case, the reference amount of photocharges may be photocharges corresponding to threshold pixel data that is used as a reference value for determining whether the corresponding pixel is a defective pixel. In more detail, when any pixel accumulates photocharges of the reference amount of photocharges or greater, the corresponding pixel may be determined to be a defective pixel. Conversely, when any pixel accumulates photocharges less than the reference amount of photocharges, the corresponding pixel may be determined to be a normal pixel.

In the example of FIG. 9, in the binning mode, the photoelectric conversion element of the defective pixel may transmit 90 photocharges to the floating diffusion region (FD), and the photoelectric conversion element of the normal pixel may transmit no photocharges to the floating diffusion region (FD). As a result, in the binning mode, 90 photocharges can be accumulated in the floating diffusion region (FD).

Although the implementations shown in the drawings from FIG. 9 are disclosed using specific numerical values as examples for convenience of description and better understanding of the disclosed technology, other implementations are also possible.

The pixel 800c may have the same conversion gain (CG) (for example, 0.1 [mV/e]) in both of the single mode and the binning mode.

Assuming that the pixel 800c includes the defective pixel and the normal pixel, 90 photocharges accumulated in the photoelectric conversion element of the defective pixel in the binning mode can be transmitted to the floating diffusion region (FD), so that the 90 photocharges can be converted into a pixel signal (PS_D) of 9 [mV] according to a conversion gain (CG) of 0.1 [mV/e].

In some implementations, it is assumed that the output range of the ADC 140 is fixed to 0~1000 [DN] for convenience of description and better understanding of the disclosed technology. In the dark condition, when pixel data of a specific pixel (e.g., single pixel or binning pixel) is equal to or greater than threshold pixel data of 80 [DN], the specific pixel can be determined to be a defective pixel. In addition, in the dark condition, when pixel data of a specific pixel (e.g., single pixel or binning pixel) is less than the threshold pixel data of 80 [DN], the specific pixel can be determined to be a normal pixel. The determination of the defective pixel or the normal pixel can be performed by an image processor (not shown), and the image processor (not shown) may perform interpolation of pixel data of the defective pixel using pixel data of other pixels adjacent to the defective pixel.

According to a comparative example of the disclosed technology, assuming that the input range of the ADC 140 in the single mode and the input range of the ADC 140 in the binning mode are equally fixed to a fourth input range (IR_S) of 0~90 mV, the pixel signal (PS_D) of 9 mV generated by the binning pixel in the dark condition can be converted into pixel data (PDA_S) of 100[DN]. That is, the pixel data (PDA_S) of the binning pixel may correspond to 100 [DN] of more than 80 [DN] indicating threshold pixel data, so that the binning pixel can be determined to be a defective pixel.

In some implementations, the input range of the ADC 140 in the single mode and the input range of the ADC 140 in the binning mode can be determined differently from each other. For example, the input range of the ADC 140 in the single mode may be set to the fourth input range (IR_S) of 0~90 mV, and the input range of the ADC 140 in the binning mode may be set to a fifth input range (IR_B) of 0~120 mV larger than the fourth input range (IR_S) of 0~90 mV. In this case, in the dark condition, the pixel signal (PS_D) of 9 mV generated by the binning pixel can be converted into pixel data (PDA_B) of 75 [DN]. That is, the pixel data (PDA_B) of the binning pixel may be set to 75 [DN] less than 80 [DN] indicating threshold pixel data, so that the binning pixel can be determined to be a normal pixel.

In some implementations, the input range of the ADC 140 in the single mode and the input range of the ADC 140 in the binning mode may be determined differently from each other, so that the ratio for determining the binning pixel to be the defective pixel can be adjusted.

FIG. 10A is a diagram illustrating an example of pixel data of the plurality of single pixels shown in FIG. 8A.

Referring to FIG. 10A, pixel data of each of the single pixels S11~S48 in the dark condition is illustrated. The example of FIG. 10A will hereinafter be described in detail with reference to FIG. 9 illustrating the threshold pixel data, the conversion gain (0.1 [mV/e]), the fourth input range (0~90 [mV]) of the ADC 140, and the output range (0~1000 [DN]) of the ADC 140.

In FIG. 10A, a pixel signal of the single pixel S16 can be converted into pixel data of 200. In this case, the pixel signal of the single pixel S16 may correspond to 18 [mV].

A pixel signal of the single pixel S23 can be converted into pixel data of 100. In this case, the pixel signal of the single pixel S23 may correspond to 9 [mV].

A pixel signal of the single pixel S32 can be converted into pixel data of 120. In this case, the pixel signal of the single pixel S32 may correspond to 10.8 [mV].

A pixel signal of each of the single pixels S35 and S45 can be converted into pixel data of 40. In this case, the pixel signal of each of the single pixels S35 and S45 may correspond to 3.6 [mV].

A pixel signal of the single pixel S37 can be converted into pixel data of 1000. In this case, the pixel signal of the single pixel S37 may correspond to 90 [mV].

As can be seen from FIG. 10A, a pixel signal of each of the remaining single pixels (e.g., S11, S12, etc.) can be converted into pixel data of 0. In this case, the pixel signal of each single pixel may correspond to 0 [mV].

Each of the single pixels S16, S23, S32, and S37 has pixel data of at least 80 [DN] indicating threshold pixel data, so that the corresponding pixel can be determined to be a defective pixel. Each of the remaining pixels other than the single pixels S16, S23, S32, and S37 has pixel data of less than 80 [DN] indicating threshold pixel data, so that the corresponding pixel can be determined to be a normal pixel.

Thus, as shown in FIG. 10A, the ratio (i.e., the ratio of defective pixels, hereinafter referred to as a defect ratio) of the number of defective pixels to a total number of pixels can be denoted by 4/32 (=1/8).

Figure 10B:
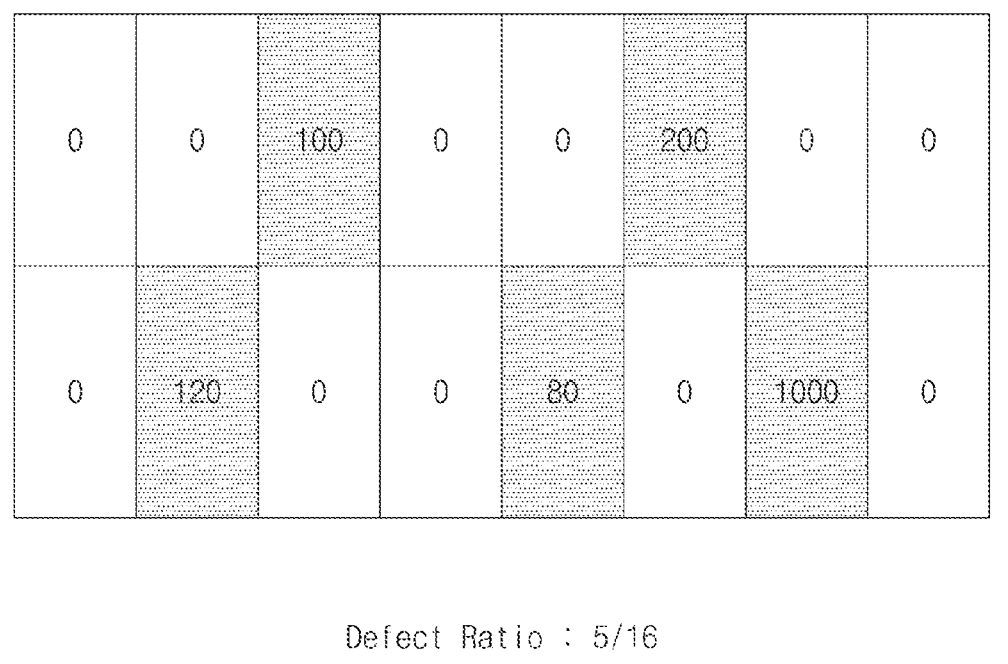

FIG. 10B is a diagram illustrating an example of pixel data of a plurality of binning pixels shown in FIG. 8B according to comparative examples of the disclosed technology.

Referring to FIG. 10B, pixel data of each of the binning pixels B11~B28 in the dark condition is illustrated. The example of FIG. 10B will hereinafter be described in detail with reference to FIG. 9 illustrating the threshold pixel data, the conversion gain (0.1 [mV/e]), the fourth input range (0~90 [mV]) of the ADC 140, and the output range (0~1000 [DN]) of the ADC 140. In other words, according to the comparative example of the disclosed technology, even in the binning mode, when the ADC 140 has the fourth input range 0~90 [mV] in the same manner as in the single mode, pixel data of the binning pixels B11-B28 will hereinafter be described with reference to the attached drawings.

A pixel signal of the binning pixel B13 may be the sum of pixel signals of the single pixels S13 and S23, may correspond to 9 [mV], and may be converted into pixel data of 100 by the fourth input range of 0~90 [mV].

A pixel signal of the binning pixel B16 may be the sum of pixel signals of the single pixels S16 and S26, may correspond to 18 [mV], and may be converted into pixel data of 200 by the fourth input range of 0~90 [mV].

A pixel signal of the binning pixel B22 may be the sum of pixel signals of the single pixels S32 and S42, may correspond to 10.8 [mV], and may be converted into pixel data of 120 by the fourth input range of 0~90 [mV].

A pixel signal of the binning pixel B25 may be the sum of pixel signals of the single pixels S35 and S45, may correspond to 7.2 [mV], and may be converted into pixel data of 80 by the fourth input range of 0~90 [mV].

A pixel signal of the binning pixel B27 may be the sum of pixel signals of the single pixels S37 and S47, may correspond to 90 [mV], and may be converted into pixel data of 1000 by the fourth input range of 0~90 [mV].

As can be seen from FIG. 10B, a pixel signal of each of the remaining binning pixels (e.g., B11, B12, etc.) can be converted into pixel data of 0. In this case, the pixel signal of each binning pixel may correspond to 0 [mV].

Each of the binning pixels B13, B16, B22, B25, and B27 has pixel data of at least 80 [DN] indicating threshold pixel data, so that the corresponding pixel can be determined to be a defective pixel.

Each of the remaining pixels other than the binning pixels B13, B16, B22, B25, and B27 has pixel data of less than 80 [DN] indicating threshold pixel data, so that the corresponding pixel can be determined to be a normal pixel.

Thus, as shown in FIG. 10B, the ratio (i.e., defect ratio) of the number of defective pixels to a total number of pixels can be denoted by 5/16.

FIG. 10C is a diagram illustrating an example of pixel data of the binning pixels shown in FIG. 8B based on some implementations of the disclosed technology.

Referring to FIG. 10C, pixel data of each of the binning pixels B11-B28 in the dark condition is illustrated. The example of FIG. 10C will hereinafter be described in detail with reference to FIG. 9 illustrating the threshold pixel data, the conversion gain (0.1 [mV/e]), the fifth input range (0~120 [mV]) of the ADC 140, and the output range (0~1000 [DN]) of the ADC 140. In other words, according to the comparative example of the disclosed technology, when the ADC 140 has the fifth input range 0~120 [mV] in the binning mode in a different way from the single mode, pixel data of the binning pixels B11-B28 will hereinafter be described with reference to the attached drawings.

A pixel signal of the binning pixel B13 may be the sum of pixel signals of the single pixels S13 and S23, may correspond to 9 [mV], and may be converted into pixel data of 75 by the fifth input range of 0~120 [mV].

A pixel signal of the binning pixel B16 may be the sum of pixel signals of the single pixels S16 and S26, may correspond to 18 [mV], and may be converted into pixel data of 150 by the fifth input range of 0~120 [mV].

A pixel signal of the binning pixel B22 may be the sum of pixel signals of the single pixels S32 and S42, may correspond to 10.8 [mV], and may be converted into pixel data of 90 by the fifth input range of 0~120 [mV].

A pixel signal of the binning pixel B25 may be the sum of pixel signals of the single pixels S35 and S45, may correspond to 7.2 [mV], and may be converted into pixel data of 60 by the fifth input range of 0~120 [mV].

A pixel signal of the binning pixel B27 may be the sum of pixel signals of the single pixels S37 and S47, may correspond to 90 [mV], and may be converted into pixel data of 1000 by the fifth input range of 0~120 [mV].

As can be seen from FIG. 10C, a pixel signal of each of the remaining binning pixels (e.g., B11, B12, etc.) can be converted into pixel data of 0. In this case, the pixel signal of each binning pixel may correspond to 0 [mV].

Each of the binning pixels B16, B22, and B27 has pixel data of at least 80 [DN] indicating threshold pixel data, so that the corresponding pixel can be determined to be a defective pixel. Each of the remaining pixels other than the binning pixels B16, B22, and B27 has pixel data of less than 80 [DN] indicating threshold pixel data, so that the corresponding pixel can be determined to be a normal pixel.

Thus, as shown in FIG. 10C, the ratio (i.e., defect ratio) of the number of defective pixels to a total number of pixels can be denoted by 3/16.

Since the defective pixel requires additional processing by the image processor (not shown) that has to perform interpolation using pixel data of adjacent pixels of the defective pixel, power consumption required for image processing may unavoidably increase, and an image quality may degrade due to such interpolation.

As shown in FIG. 10C, according to one embodiment of the disclosed technology, the input range of the ADC 140 can be controlled in the binning mode, so that the ratio of defective pixels (i.e., defect ratio) can be reduced. As a result, in the binning mode, power consumption unnecessary for image processing of the defective pixel can be reduced, and interpolation processing is omitted from the image processing, resulting in improvement in the image quality.

As is apparent from the above description, the image sensing device based on some implementations of the disclosed technology can vary an input range of the Analog-to-Digital Converter (ADC) in response to each mode of pixels, thereby acquiring pixel data optimized for each mode of the pixels.

Although a number of illustrative embodiments have been described, it should be understood that modifications and enhancements to the disclosed embodiments and other embodiments can be devised based on what is described and/or illustrated in this patent document.

What is claimed is:

1. An image sensing device comprising:
    a pixel array of pixels that are operable to sense light to produce pixel signals and are operable to operate in one of a plurality of modes in sensing of light, wherein a first pixel of the pixel array is controlled to operate in a mode selected from the plurality of modes and configured to output a pixel signal in response to light incident onto the first pixel;
    an analog-to-digital converter (ADC) coupled to the pixel array to receive the pixel signal from the first pixel and configured to set, based on the mode selected for the first pixel in generating the pixel signal, an input range indicating an input voltage range of the analog-to-digital converter (ADC) in which the pixel signal is capable of being converted into pixel data representing the pixel signal and perform an analog to digital conversion of the pixel signal generated by the first pixel;
    a mode selector configured to generate a mode selection signal corresponding to the selected mode for the first pixel;
    a row driver coupled to be in communication with the mode selector to receive the mode selection signal for the first pixel and generate a pixel control signal for driving the first pixel to operate in the selected mode; and
    an input range controller coupled to be in communication with the mode selector to receive the mode selection signal and generate an input range control signal corresponding to the selected mode, wherein the input range controller is coupled to be in communication with the analog-to-digital converter (ADC) to send the input range control signal to the analog-to-digital converter (ADC) for performing the analog to digital conversion of the pixel signal generated by the first pixel.

2. The image sensing device according to claim 1, wherein the analog-to-digital converter (ADC) includes:
    a ramp signal generator configured to generate a ramp signal, a voltage of which decreases with a slope corresponding to the input range control signal;
    a comparator coupled to the ramp signal generator to receive the ramp signal and configured to generate a comparison signal corresponding to a relationship in magnitude between the pixel signal and the ramp signal; and
    a counter coupled to the comparator to receive the comparison signal and configured to perform counting until the comparison signal transitions from a first level to a second level different from the first level, and output an accumulated counting value as the pixel data.

3. The image sensing device according to claim 2, wherein the ramp signal generator includes:
    a current generator configured to receive a ramp bias voltage having a constant voltage level and generate a current that decreases over time; and
    a variable resistor configured to control the slope of the ramp signal that is generated by the current according to the input range control signal.

4. The image sensing device according to claim 3, wherein the analog-to-digital converter (ADC) is configured to:
    decrease the input range of the analog-to-digital converter (ADC) as a resistance value of the variable resistor decreases; and
    increase the input range of the analog-to-digital converter (ADC) as the resistance value of the variable resistor increases.

5. The image sensing device according to claim 1, wherein the plurality of modes includes:
    a high conversion gain (HCG) mode in which an amount of increase in response of a pixel in response to an increase in an intensity of incident light is relatively large; and
    a low conversion gain (LCG) mode in which the amount of increase in response of the pixel in response to an increase in the intensity of incident light is relatively small.

6. The image sensing device according to claim 5, wherein:
    the analog-to-digital converter (ADC) is configured to set a first input range for the first pixel operating in the high conversion gain (HCG) mode and a second input range for the first pixel operating in the low conversion gain (LCG) mode, the second input range being smaller than the first input range.

7. The image sensing device according to claim 5, wherein the first pixel includes:
    a floating diffusion region configured to accumulate photocharges corresponding to the intensity of incident light therein, and be coupled to a first capacitor;
    a first conversion gain (CG) transistor coupled between the floating diffusion region and a second capacitor; and
    a second conversion gain (CG) transistor coupled between the floating diffusion region and a third capacitor,
    wherein
        in the high conversion gain (HCG) mode, each of the first conversion gain (CG) transistor and the second conversion gain (CG) transistor is turned off; and
        in the low conversion gain (LCG) mode, each of the first conversion gain (CG) transistor and the second conversion gain (CG) transistor is turned on.

8. The image sensing device according to claim 7, wherein the plurality of modes further includes:
    a middle conversion gain (MCG) mode in which the amount of increase in response of the pixel in response to an increase in the intensity of incident light is smaller than that of the high conversion gain (HCG) mode, and is larger than that of the low conversion gain (LCG) mode.

9. The image sensing device according to claim 8, wherein:
    the analog-to-digital converter (ADC) is configured to have a third input range for the first pixel operating in the middle conversion gain (MCG) mode, the third input range being smaller than a first input range for the first pixel operating in the high conversion gain (HCG)

mode and greater than a second input range for the first pixel operating in the low conversion gain (LCG) mode.

10. The image sensing device according to claim 9, wherein:
in the middle conversion gain (MCG) mode, the first conversion gain (CG) transistor is turned on, and the second conversion gain (CG) transistor is turned off.

11. The image sensing device according to claim 1, wherein the plurality of modes includes:
a single mode in which the pixel signal output from the first pixel corresponds to photocharges that are generated and accumulated in one photoelectric conversion element; and
a binning mode in which the pixel signal output from the first pixel corresponds to photocharges that are generated and accumulated in a plurality of photoelectric conversion elements.

12. The image sensing device according to claim 11, wherein:
the analog-to-digital converter (ADC) is configured to have a fourth input range for the first pixel operating in the single mode and
a fifth input range for the first pixel operating in the binning mode, the fifth input range larger than the fourth input range.

13. An image sensing device comprising:
a pixel operable to sense light in one of different modes with different sensing characteristics and configured to output a pixel signal in response to incident light when being controlled to operate in a mode selected from the different modes;
an analog-to-digital converter (ADC) configured to receive the pixel signal from the pixel operating in the selected mode and convert the pixel signal into pixel data based on an input range of the analog-to-digital converter (ADC) that is set based on the selected mode from the different modes in operating the pixel in sensing the incident light; and
a timing controller coupled to be in communication with the analog-to-digital converter (ADC) and configured to control the analog-to-digital converter (ADC) to set the input range of the analog-to-digital converter (ADC) based on the selected mode of the pixel,
wherein
the input range is an input voltage range of the analog-to-digital converter (ADC) in which the pixel signal is capable of being converted into pixel data representing the pixel signal;
wherein the different modes includes:
a high conversion gain (HCG) mode in which an amount of increase in response of a pixel in response to an increase in an intensity of incident light is relatively large; and
a low conversion gain (LCG) mode in which the amount of increase in response of the pixel in response to an increase in the intensity of incident light is relatively small,
wherein the pixel includes:
a floating diffusion region configured to accumulate photocharges corresponding to the intensity of incident light therein, and be coupled to a first capacitor;
a first conversion gain (CG) transistor coupled between the floating diffusion region and a second capacitor; and
a second conversion gain (CG) transistor coupled between the floating diffusion region and a third capacitor, and
wherein
in the high conversion gain (HCG) mode, each of the first conversion gain (CG) transistor and the second conversion gain (CG) transistor is turned off; and
in the low conversion gain (LCG) mode, each of the first conversion gain (CG) transistor and the second conversion gain (CG) transistor is turned on.

14. The image sensing device of claim 13, wherein the different modes include (1) a single mode in which the pixel signal output from the pixel corresponds to photocharges that are generated and accumulated in one photoelectric conversion element and (2) a binning mode in which the pixel signal output from the pixel corresponds to photocharges that are generated and accumulated in a plurality of photoelectric conversion elements.

15. The image sensing device of claim 13, wherein the analog-to-digital converter (ADC) includes a variable resistor with a resistance value that changes based on a mode selected out of the different modes for operating the pixel.

16. The image sensing device of claim 15, wherein the analog-to-digital converter (ADC) is configured to change the input range using the resistance value of the variable resistor.

17. The image sensing device of claim 15, wherein the analog-to-digital converter (ADC) is configured to determine a value of the pixel data based on the resistance value of the variable resistor.

18. An image sensing device comprising:
a pixel array of pixels that are operable to sense light to produce pixel signals and are operable to operate in one of a plurality of modes in sensing of light, wherein a first pixel of the pixel array is controlled to operate in a mode selected from the plurality of modes and configured to output a pixel signal in response to light incident onto the first pixel;
an analog-to-digital converter (ADC) coupled to the pixel array to receive the pixel signal from the first pixel and configured to set, based on the mode selected for the first pixel in generating the pixel signal, an input range indicating a voltage range of the pixel signal and perform an analog to digital conversion of the pixel signal generated by the first pixel to produce pixel data representing the pixel signal based on the input range of the analog-to-digital converter (ADC);
a mode selector configured to generate a mode selection signal corresponding to the selected mode for the first pixel;
a row driver coupled to be in communication with the mode selector to receive the mode selection signal for the first pixel and generate a pixel control signal for driving the first pixel to operate in the selected mode; and
an input range controller coupled to be in communication with the mode selector to receive the mode selection signal and configured to generate an input range control signal corresponding to the selected mode, wherein the input range controller is coupled to be in communication with the analog-to-digital converter (ADC) to send the input range control signal to the analog-to-digital converter (ADC) for performing the analog to digital conversion of the pixel signal generated by the first pixel.

19. The image sensing device of claim 18, wherein the plurality of modes includes:

a high conversion gain (HCG) mode in which an amount of increase in response of a pixel in response to an increase in an intensity of incident light is relatively large; and a low conversion gain (LCG) mode in which the amount of increase in response of the pixel in response to an increase in the intensity of incident light is relatively small.

20. The image sensing device of claim 18, wherein the plurality of modes includes:

a single mode in which the pixel signal output from the first pixel corresponds to photocharges that are generated and accumulated in one photoelectric conversion element; and a binning mode in which the pixel signal output from the first pixel corresponds to photocharges that are generated and accumulated in a plurality of photoelectric conversion elements.

* * * * *